(12) United States Patent
Cecchetti et al.

(10) Patent No.: US 9,910,766 B2
(45) Date of Patent: Mar. 6, 2018

(54) WHITEBOX NETWORK FUZZING

(71) Applicant: Peach Fuzzer LLC, Seattle, WA (US)

(72) Inventors: Adam Cecchetti, Seattle, WA (US);
Michael Eddington, Seattle, WA (US)

(73) Assignee: PEACH FUZZER LLC, Seattle, WA (US)

( * ) Notice: Subject to any disclaimer, the term of this patent is extended or adjusted under 35 U.S.C. 154(b) by 90 days.

(21) Appl. No.: 15/164,821

(22) Filed: May 25, 2016

(65) Prior Publication Data

US 2016/0350211 A1 Dec. 1, 2016

Related U.S. Application Data

(60) Provisional application No. 62/169,515, filed on Jun. 1, 2015.

(51) Int. Cl.
*G06F 9/44* (2006.01)
*G06F 11/00* (2006.01)
*G06F 11/36* (2006.01)

(52) U.S. Cl.
CPC ...... *G06F 11/3696* (2013.01); *G06F 11/3664* (2013.01); *G06F 11/3668* (2013.01)

(58) Field of Classification Search
CPC ............. G06F 11/3664; G06F 11/3668; G06F 11/3696
USPC ............................ 717/124–135; 714/37, 38.1
See application file for complete search history.

(56) References Cited

U.S. PATENT DOCUMENTS

| | | | | |
|---|---|---|---|---|
| 2008/0301813 A1* | 12/2008 | Neystadt | ............. | G06F 11/3672 726/25 |
| 2008/0320328 A1* | 12/2008 | O'Leary | ................. | G06F 21/57 714/25 |
| 2010/0281460 A1* | 11/2010 | Tillmann | ............ | G06F 11/3612 717/106 |
| 2011/0314454 A1* | 12/2011 | Godefroid | ........... | G06F 11/3676 717/131 |
| 2012/0089868 A1* | 4/2012 | Meijer | .................. | G06F 11/076 714/26 |

(Continued)

OTHER PUBLICATIONS

Eddington, Michael, "Demystifying Fuzzers," Jan. 1, 2009, Leviathan Security Group, Inc., p. 1-11.*

(Continued)

*Primary Examiner* — Qing Chen
(74) *Attorney, Agent, or Firm* — Amin, Turocy & Watson, LLP

(57) ABSTRACT

Software testing of networked devices using whitebox fuzzing is provided. Target network device (TC) can execute a software target that can selectively receive fuzzed data to perturb the execution of the software target. The perturbation can be correlated with the fuzzed data to detect intentional and unintentional features of the software target in. Information related to the interaction of the TC and a target network peer device (TPC) can be employed to determine a state input. Optionally, the TC can interact with the TPC normally until a determined state input, at which point, a fuzzed input can be substituted into the communication to the TC as if it were from the TPC. Resulting deviations from normal operation can then be determined and analyzed. Further optionally, a session dependent conditional and corresponding value can be determined.

20 Claims, 11 Drawing Sheets

(56) References Cited

U.S. PATENT DOCUMENTS

2013/0340083 A1* 12/2013 Petrica .................. G06F 11/263
                                                                      726/25
2014/0047275 A1*  2/2014 Eddington .......... G06F 11/0766
                                                                      714/37
2015/0026669 A1*  1/2015 Eddington ................ G06F 8/51
                                                                      717/137

OTHER PUBLICATIONS

"Peach Fuzzing Platform," Apr. 13, 2013, <http://peachfuzzer.com/Introduction.html>, p. 1-2.*
Nieystadt, John. "Automated Penetration Testing with White-Box Fuzzing", Feb. 2008. [https://msdn.microsoft.com/en-us/library/cc162782.aspx,] retrieved Mar. 24, 2016, 12 pages.
Wikipedia. "Fuzz Testing", [https://en.wikipedia.org/wiki/Fuzz_testing], retrieved Mar. 24, 2016, 6 pages.
Godefroid, et al. "Automated Whitebox Fuzz Testing", [http://research.microsoft.com/en-us/um/people/pg/public_psfiles/ndss2008.pdf], retrieved Mar. 24, 2016, 16 pages.

* cited by examiner

WHITEBOX NETWORK FUZZING

CROSS-REFERENCE TO RELATED APPLICATIONS

The present application claims priority to U.S. Provisional Patent Application No. 62/169,515, entitled "GIMPLE: WHITEBOX NETWORK FUZZING," filed on 1 Jun. 2015, which is hereby incorporated by reference in its entirety.

TECHNICAL FIELD

The disclosed subject matter relates to software testing and, more particularly, to analysis related to perturbation of representations of networked software under test.

BACKGROUND

By way of brief background, there are two major families of fuzzers currently in use. One family of fuzzers are commonly known as blackbox fuzzers, which generally require no information about the software target that will be tested. The other family of fuzzers are commonly known as whitebox fuzzers, which typically perform some level of instrumentation and dynamic analysis of the software target execution. Whitebox fuzzers are generally better than blackbox fuzzers at finding security issues in a software target, but also typically have many limitations that can make whitebox fuzzing challenging to use. One common limitation of a whitebox fuzzer is fuzzing a networked software target. A conventional whitebox fuzzer can be unable to fuzz a networked software target and can be limited to a single-file-consuming software target. Using whitebox fuzzing technology with complex network software targets is a much needed technology leap.

DETAILED DESCRIPTION

Figure 1:
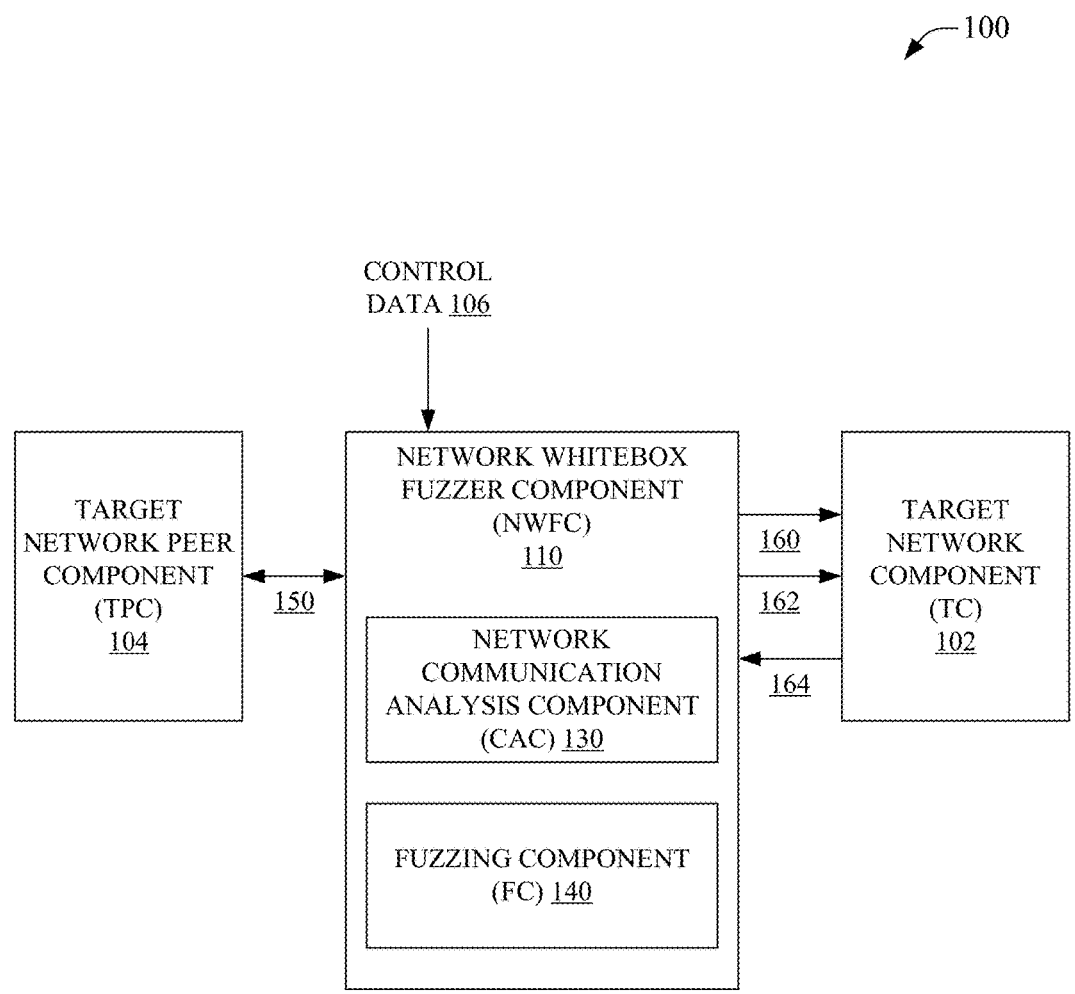
FIG. 1 is an illustration of a system that facilitates whitebox fuzzing of a networked software target in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Software testing can be employed to determine characteristics of software under test. Common uses of software testing can include determining potential security problems, checking for crashes, failing assertions, or memory leaks, or other bugs in software under test (SUT). One software testing technique can be "fuzzing" (or "fuzz testing"), which can include automated or semi-automated perturbation of inputs to SUT, e.g., providing invalid, unexpected, random data, etc., as an input to the SUT. As an example, a code segment that creates a variable, accesses a value and then assigns the value to the variable, and then prints the variable, can be fuzzed by fuzzing the value, fuzzing the code segment itself, etc. Fuzzing can facilitate identification of issues, for example, in a run time environment, heap corruption, a use-after-free bug, a memory disclosure, etc.

Fuzz testing can be performed by 'fuzzers'. Fuzzers can 'fuzz' input for a SUT. Fuzzing can generally include a software testing technique that is typically fully automated and involves providing invalid, unexpected or random data to the inputs of a computer program. The program, e.g., SUT, can then monitored for exceptions, e.g., crashes, faults, loops, errors, etc. In some embodiments, the effectiveness of a fuzzer can be measured by the 'code coverage of testing', e.g., an amount of a target program that is exposed through testing, and a level of ability to cause abnormal behavior, such as crashes, that are indicated as of interest to a user of the fuzzer. A 'fuzzer' can be a system, method, device, etc., related to fuzzing. To 'fuzz' can include perturbation of input to a SUT, including perturbation of a set of input data, e.g., a determined data set comprising perturbed inputs can be termed 'fuzzed data', a 'fuzz data file', or similar language. To 'fuzz' can further include perturbation of code, or a code segment, comprised in the SUT. It is desirable to capture differences in the execution of code or code segments based on fuzz tests of the code or code segment in addition to more conventional fuzzing of data passed into the original code segment and/or a perturbed code segment.

One family of fuzzers is commonly known as blackbox fuzzers, which generally require no information about the software target that will be tested. A blackbox fuzzer generally operates outside the process space of a software target, hereinafter 'target'. Blackbox fuzzers can have models to assist in producing data for a target, but typically a blackbox fuzzer has no direct knowledge of how the target is executing. A blackbox fuzzer can be, in some embodiments, used from a different machine than the target. An example of a blackbox fuzzer can be Peach™ that can, for example, run on a laptop to test a network router.

Another family of fuzzers is commonly known as whitebox fuzzers, which typically perform some level of instrumentation and dynamic analysis of the software target execution. A whitebox fuzzer can operate, at least partially, in a process space of a target. A whitebox fuzzer can monitor an execution of a target process to make decisions about how to produce data, e.g., fuzzed data, etc. In an embodiment, monitoring the execution of the target process can be something as simple as collecting code coverage information, e.g., information related to an amount of code tested in relation to the extents of the code. In another embodiment, monitoring the execution of the target process can be more complex, such as tracing data through the execution of the process, e.g., data tainting, etc. Whitebox fuzzers can generally be better than blackbox fuzzers at finding issues in a target, but also can be challenging to use for some targets. One common limitation of a whitebox fuzzer is fuzzing a network target. A conventional whitebox fuzzer can be unable to fuzz a network target and can be limited to a single-file-consuming software target. Whitebox fuzzing can be automated to allow application of a determined mutation technique to data to be provided as part of fuzz testing a target. Whitebox fuzzers are generally considered the current cutting edge for fuzzers as they can produce a much higher code-coverage of testing than blackbox fuzzers, typically with less implementation effort. However, there are generally substantial complexity issues with whitebox fuzzers.

A 'state input' for a network target can be defined as all read operations occurring up to a next write operation. A network target being tested can be comprised of a series of state inputs. A state input can correspond to a logical input, such as an authentication message, a make directory message, etc., such as illustrated in the following example. In the following example, a typical network communication can comprise a series of sending and receiving data. A simple network protocol can be represented as the following:
1. [Client] Connect to server
2. [Server] Send hello message
3. [Client] Send authentication message
4. [Server] Send authorized message For each of these network protocol steps an actual API call to perform the indicated I/O operations can be as:
1. [Client] Connect to server
   a. [Client] socket=connect(host, port)
   b. [Server] client_socket=accept( )
2. [Server] Send hello message
   a. [Server] write(client_socket, hello_msg)
   b. [Client] read(socket, msg_header)
   c. [Client] read(socket, msg_body)
3. [Client] Send authentication message
   a. [Client] write(socket, auth_msg)
   b. [Server] read(client_socket, msg_header)
   c. [Server] read(client_socket, auth_body)
4. [Server] Send authorized message
   a. [Server] write(client_socket, auth_reply)
   b. [Client] read(socket, msg_header)
   c. [Client] read(socket, msg_body)
5. [Client] Send make directory message
   a. [Client] write(socket, mkdir_msg)
   b. [Server] read(client_socket, msg_header)
   c. [Server] read(client_socket, msg_body)
6. [Server] Send make directory response message
   a. [Server] write(socket, mkdir_response)
   b. [Client] read(socket, msg_header)
   c. [Client] read(socket, msg_body)

Listing the API calls for just the server side of the communication:

```
[Server] client_socket = accept( )
[Server] write(client_socket, hello_msg)
[Server] read(client_socket, msg_header)      ⎫
                                              ⎬ State Input #1
[Server] read(client_socket, auth_body)       ⎭
[Server] write(client_socket, auth_reply)
[Server] read(client_socket, msg_header)      ⎫
                                              ⎬ State Input #2
[Server] read(client_socket, msg_body)        ⎭
[Server] write(client_socket, mkdir_response)
```

As illustrated by the foregoing example, a first state input can be the state existing in the target before the: "[Server] write(client_socket, auth_reply)" API call from the server, and a second state input can be the state existing in the target before the: "[Server] write(client_socket, mkdir_response)" API call from the server.

The current research into whitebox fuzzers, and/or smart fuzzers, has managed some success in fuzzing single input targets in which deterministic behavior occurs corresponding directly to an input. However, network targets generally have multiple input and output events with, sometimes complex, relationships between data in each input/output operation. Two distinct state systems can be employed to progress through a network target interaction data flow, e.g., a client state system and a server state system. Adoption of a multiple distinct state representation of networked devices can make network fuzzing possible in stark contrast to conventional smart/whitebox systems. Further, it will be noted that a multiple distinct state representation of networked devices is expressly not limited to a server state and a client state and that the terms 'target state' and 'target peer state' can be adopted as more general representation. Similar terms can also be employed, e.g., target network device, target network device peer, etc., without departing from the scope of the instant disclosure. In some embodiments, though not expressly disclosed herein for the sake of clarity and brevity, can comprise a plurality of targets, target peers, etc., that can each be associated with distinct state inputs and distinct state representations.

In an aspect, each state representation can enable fuzzing of the next following data write between networked device(s)/component(s). This can allow utilization of an existing client, e.g., target peer, when fuzzing as server, e.g., target. As such, the server can be treated as the target, the client as the target peer, the client can be utilized by the whitebox fuzzer, and the data writes from the target peer to the target can be fuzzed, resulting in fuzzing of data writes to the server. Similarly, when targeting a client, the reverse can be employed, e.g., in the reverse the client can be treated as the target, the server as the target peer, the server can be utilized by the whitebox fuzzer, and the data writes from the target peer to the target can be fuzzed, resulting in fuzzing of data writes to the client. Each state input can be viewed as representing state of the target immediately preceding a data write to the target and, as such, data to be written to the target can be fuzzed by a whitebox fuzzer, this can be termed 'fuzzing the state input' or other similar terms. To fuzz the $N^{th}$ state input, a target peer can be used to progress the target up to the $N^{th}$ input point via normal execution of the calls between the target and target peer. Then, at the $N^{th}$ state input, a whitebox fuzzer can interrupt the normal communication and substitute fuzzed data as the input for the targeted Nth state input. The normal operation can then be allowed to continue to determine if changes in the execution of the networked software target occurs, and such changes can be attributed to the fuzzed data at the $N^{th}$ state input.

In network interactions between a target and target peer, the complexity of the call and response interaction across a network can consume a substantial portion of the time associated with testing a particular state input. Performance gains can be made by using virtualized execution of the process to enable reverting the system to the $N^{th}$ state input instead of replaying the entire communication between target and target peer for each test of the $N^{th}$ state input. Reverting allows the virtualized devices to be set directly at the $N^{th}$ state input for each iteration of the fuzz testing of the $N^{th}$ state input. Additionally, a virtualized process can be parallelized by using multiple instances of the target, target peer, etc., wherein each parallel instance can fuzz test a different state input. This process can be scaled into a cloud computing environment to allow for realistic runtimes. A cloud computing environment can comprise a pool of configurable computing resources, e.g., networks, servers, storage, applications and services, which can be provisioned and released as needed. This pool is generally shared and provisioning of resources is related to an agreement between a client and a cloud computing environment provider.

Some network protocols can have values that can change for different instances of an execution of a target process. As an example, consider a protocol in which a server provides a connection identifier that is a random number. This example identifier must typically be sent with each message to validate the authenticity of the message. This example session dependent value can limit the effectiveness of a conventional whitebox fuzzer that can generally not be able to produce values capable of getting past such a check. A solution can comprise identifying 'conditionals', e.g., session dependent values, and corresponding data that changes for different instances of target execution. The data can then be provided to the real target peer when a conditional is encountered in the fuzz testing of a target. Whereas the presently disclosed subject matter details that the peer is being run by the whitebox fuzzer on each execution, the whitebox fuzzer can have knowledge of the conditionals and associated validating data such that, when a conditional is encountered in the testing, valid data can be provided allowing fuzz testing to progress to the state input to be tested.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates whitebox fuzzing of a networked software target in accordance with aspects of the subject disclosure. System 100 can comprise network whitebox fuzzer component (NWFC) 110 that can enable communication of fuzzed data, e.g., fuzzed data 162, etc., to target network component (TC) 102. NWFC 110 can receive target-side output communication 164 from TC 102 and can enable access to target-side input communication 160 for TC 102. NWFC 110 can send/receive target peer-side communication 150 to/from target network peer component (TPC) 104. In an embodiment, NWFC 110 can pass typical network communications between TC 102 and TPC 104. In an aspect, passing typical network communications between TC 102 and TPC 104 can enable TC 102 and TPC 104 to function as if NWFC 110 were not there, e.g., the typical network communications are passed without alteration, e.g., as target-side output communication 164, target-side input communication 160, and target peer-side communication 150.

In another aspect, the typical network communications can be interrupted, altered, modified, substituted, etc., by NWFC 110 to enable introduction of fuzzed data 162 into the interaction between TC 102 and TPC 104. As an example, target peer-side communication 150 can comprise a "hello" message from TPC 104 to TC 102 via NWFC 110 and NWFC 110 can pass the "hello" message to TC 102 unaltered, e.g., as target-side input communication 160 target-side input communication 160. This can result in TC 102 sending a "hello response" message to TPC 104 via NWFC 110, e.g., as a further component of target peer-side communication 150, in an unaltered state. TPC 104 can then respond to the "hello response" with an "authenticate" message further comprised in target peer-side communication 150. NWFC 110 can interrupt the passing of the "authenticate" message and substitute fuzzed data 162 to TC 102. TC 102 can then respond to TPC 104 based on the fuzzed data 162.

In an aspect, enabling access to fuzzed data 162 to TC 102 can alter the execution of typical network communications between TC 102 and TPC 104 because TC 102 would respond to fuzzed data 162 rather that responding to the "authenticate" message that was interrupted. Deviation in execution resulting from use of fuzzed data 162 can enable determining faults, crashes, errors, etc., resulting from reliance on fuzzed data 162 by TC 102. In an aspect, NWFC 110 can enable typical execution of a software target, e.g., software executing on TC 102, by passing unaltered communication between TC 102 and TPC 104. In a further aspect, NWFC 110 can enable perturbation of a software target by implementing fuzzed data 162 at a determined point, e.g., at a state input point, in the communication between TC 102 and TPC 104 to enable fuzz testing of a software target, e.g., software executing on TC 102.

In an aspect, NWFC 110 can determine typical communications between TC 102 and TPC 104. In an embodiment, NWFC 110 can receive control data 106 comprising information about typical communications between TC 102 and TPC 104. In another embodiment, NWFC 110 can monitor typical communications between TC 102 and TPC 104 to determine information about the typical communications, normal responses by TC 102 and/or TPC 104, etc. In an aspect, NWFC 110 can comprise network communication analysis component (CAC) 130 to facilitate analysis of monitored communication between TC 102 and TPC 104. CAC 130 can determine one or more state input(s) that can be relevant to fuzz testing of a software target. In some embodiments, state input information can be comprised in, and received via, control data 106. CAC 130 can facilitate, in some embodiments, interruption of typical network communications between TC 102 and TPC 104 via NWFC 110 to allow for insertion of fuzzed data 162.

Fuzzed data 162 can be determined by fuzzing component (FC) 140. In an embodiment, fuzzed data 162 can be premised on an interrupted message from TPC 104 meant for TC 102. As an example, FC 140 can receive and modify an "authenticate" message from TPC 104, and can enable access by TC 102 to the modified "authenticate" message. In other embodiments, fuzzed data 162 can be determined independent of an interrupted message from TPC 104 meant for TC 102. As an example, FC 140 can receive an "authenticate" message from TPC 104, interrupt this message from being sent to TC 104, and can substitute a "null" message, an integer value 4, a "hello" message, etc., that can be unrelated to a modification of the received "authenticate" message from TPC 104. Of note, NWFC 110 can therefore fuzz test a software target, e.g., software executing on TC 102, by sending nearly any information as fuzzed data 162 at a state input point. This allows for sending data that is the same as is received via target peer-side communication 150, nearly any modification of data received via target peer-side communication 150, or nearly any other data that can be unrelated to data received as via target peer-side communication 150. This can allow for highly flexible fuzz testing of a software target.

Figure 2:
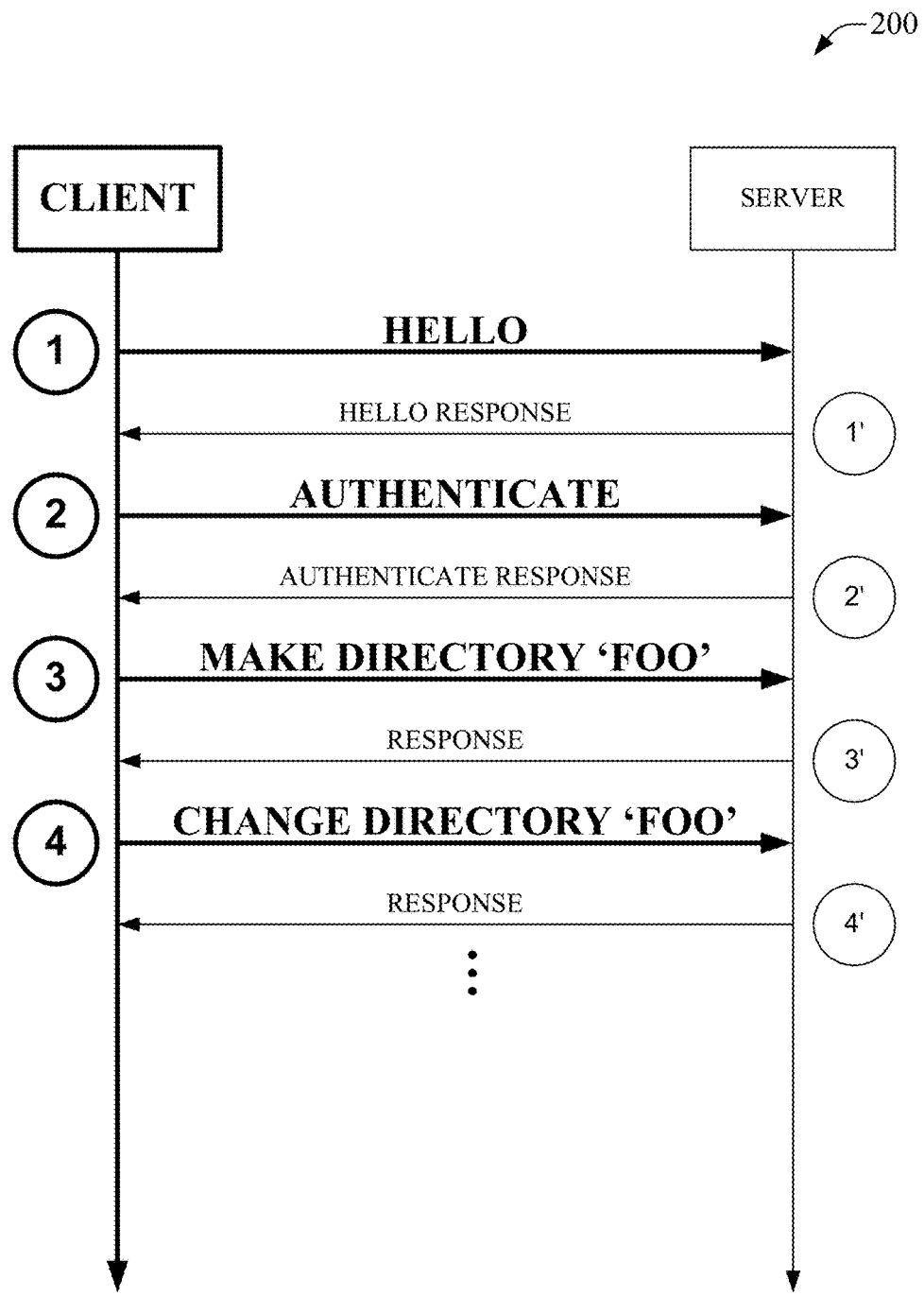
FIG. 2 is a depiction of an example exchange between a client device and server device illustrating state input locations in accordance with aspects of the subject disclosure.

FIG. 2 is a depiction 200 of an example exchange between a client device and server device illustrating state input locations in accordance with aspects of the subject disclosure. As illustrated in depiction 200 communications between a client and server can comprise a series of messages. These messages can be communicated between the server and client via a communications network. The communications network can comprise wired connections, wireless connections, etc., between network communications devices. In an embodiment, the client can be a TC, e.g., TC 102, etc., and the server can be a TPC, e.g., TPC 104, etc. In another embodiment, the server can be a TC, e.g., TC 102, etc., and the client can be a TPC, e.g., TPC 104, etc.

Depiction 200 further illustrates state input points 1-4 and 1'-4'. In an embodiment where the client can be a TC, e.g., TC 102, etc., and the server can be a TPC, e.g., TPC 104, etc., state input points 1-4 indicate points in the typical communication between the TC, e.g., the server, and TPC, e.g., the client, that can be used to insert fuzzed data, e.g., 162, etc. This can enable fuzz testing of a server-side software target. In an embodiment, the client (TPC) can execute normally, however the communications can be interrupted at one or more of state input points 1-4 to allow insertion of fuzzed data to fuzz test server-side execution of a software target. As an example, normal communications between the client and server can progress to state input point 3. At this point, "make directory 'foo'" can be interrupted and substituted with "read directory 'foo'," e.g., a fuzzed message, to test the server response to the fuzzed message. Where 'foo' has not been created already, this can result in the server throwing an error message. This result can be employed in a report generated as a result of the fuzz testing of a software target executing on the server. Continuing the present example, where 'foo' has already been created, the server can return a response without an error, which can be reported. Where 'foo' should not already exist, this can indicate an error in the server-side software target. Where 'foo' should already exist, this can indicate that the fuzzed data did not generate an error. Numerous other examples are readily appreciated but are not explicitly recited for the sake of clarity and brevity, although all such examples are to be considered within the scope of the present disclosure.

Similarly, in an embodiment where the server can be a TC, e.g., TC 102, etc., and the client can be a TPC, e.g., TPC 104, etc., state input points 1'-4' indicate points in the typical communication between the TC, e.g., the client, and TPC, e.g., the server, that can be used to insert fuzzed data, e.g., 162, etc. This can enable fuzz testing of a client-side software target. In an embodiment, the server (TPC) can execute normally, however the communications can be interrupted at one or more of state input points 1'-4' to allow insertion of fuzzed data to fuzz test client-side execution of a software target. As an example, normal communications between the client and server can progress to state input point 3'. At this point, the response to receiving "make directory 'foo'" can be interrupted and substituted with, for example, "directory 'foo' not found," e.g., a fuzzed message, to test the client response to the fuzzed message. Where the client-side software target is not expecting 'foo' not to be found, this can result in the client throwing an error message. This result can be employed in a report generated as a result of the fuzz testing of a software target executing on the client. Again, numerous other examples are readily appreciated but are not explicitly recited for the sake of clarity and brevity, although all such examples are to be considered within the scope of the present disclosure.

In an aspect, state input points 1-4 and 1'-4' can each be repeated fuzz tested before advancing to another state input point, e.g., state input point can be repeated tested until a condition is satisfied, thereafter, state input point 2 can begin to undergo fuzz testing. In some embodiments, fuzz testing can test one or more state input points in order, out of order, in a determined order, in an order based on fuzz testing of a prior state input point, etc. In some embodiments, state input points can be fuzz tested in parallel, e.g., on one or more devices executing in parallel, in a virtual computing environment, etc. This parallel fuzz testing can accelerate completion of fuzz testing in contrast to sequential fuzz testing. In some embodiments, reversion to an earlier state can be employed to accelerate fuzz testing in contrast to re-executing the communications stream from the beginning, e.g., it can be faster to revert to state input point 3 than to re-execute from state input point 1 to advance to state input point 3.

Figure 3:
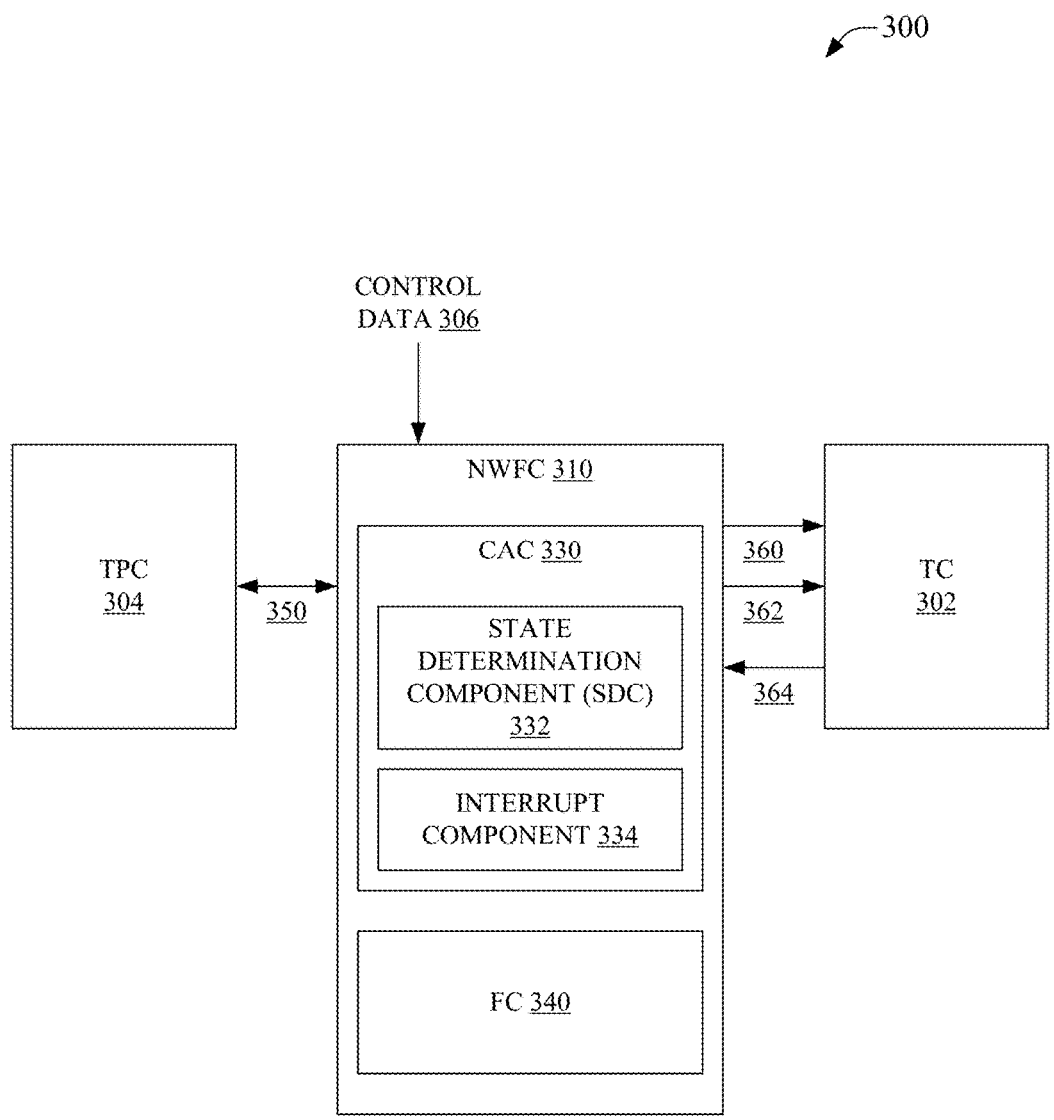
FIG. 3 illustrates a system that facilitates whitebox fuzzing of a networked software target comprising state determination in accordance with aspects of the subject disclosure.

FIG. 3 illustrates a system 300 that facilitates whitebox fuzzing of a networked software target comprising state determination in accordance with aspects of the subject disclosure. System 300 can comprise NWFC 310, which can enable communication of fuzzed data 362, etc., to TC 302. NWFC 310 can receive target-side output communication 364 from TC 302 and can enable access to target-side input communication 360 for TC 302. NWFC 310 can send/receive target peer-side communication 350 to/from TPC 304. In an embodiment, NWFC 310 can pass typical network communications between TC 302 and TPC 304. In an aspect, passing typical network communications, e.g., comprising 350, 360, and 364, between TC 302 and TPC 304 can enable TC 302 and TPC 304 to function as if NWFC 310 is transparent in a communication network, e.g., typical network communications are passed without alteration.

In another aspect, the typical network communications can be interrupted, altered, modified, substituted, etc., by NWFC 310 to enable introduction of fuzzed data 362 into the interaction between TC 302 and TPC 304. TC 302 can then respond to TPC 304 based on the fuzzed data 362. In an aspect, enabling access to fuzzed data 362 by TC 302 can result in deviation of software target execution normally premised on the typical network communications between TC 302 and TPC 304, e.g., TC 302 responds to fuzzed data 362 rather that responding to a message that was interrupted by NWFC 310, e.g., that would normally have been provided to TC 302 in target-side input communication 360. Deviation in execution resulting from use of fuzzed data 362 can enable determining faults, crashes, errors, etc., resulting from reliance on fuzzed data 362 by TC 302. In an aspect, NWFC 310 can enable typical execution of a software target, e.g., software executing on TC 302, by passing unaltered communication between TC 302 and TPC 304. In a further aspect, NWFC 310 can enable perturbation of a software target by implementing fuzzed data 362 at a state input point of the communication between TC 302 and TPC 304 to enable fuzz testing of a software target, e.g., software executing on TC 302.

In an aspect, NWFC 310 can determine typical communications between TC 302 and TPC 304. In an embodiment, NWFC 310 can receive control data 306 comprising information about typical communications between TC 302 and TPC 304. In another embodiment, NWFC 310 can monitor typical communications between TC 302 and TPC 304 to determine information about the typical communications, normal responses by TC 302 and/or TPC 304, etc. In an aspect, NWFC 310 can comprise network communication analysis component (CAC) 330 to facilitate analysis of monitored communication between TC 302 and TPC 304.

CAC 330 can comprise state determination component (SDC) 332, which can determine one or more state input(s) that can be relevant to fuzz testing of a software target. In an aspect, SDC 332 can determine where a message will be written to a software target executing on TC 302. This write message point can be designated as a state input. Analysis of typical communication between TC 302 and TPC 304, e.g., without fuzzing of data, can enable SDC 332 to determine the state input points. These state input points can then enable fuzz testing of the software target of TC 302 by inserting fuzzed data 362 and analysis of the subsequent software target execution for deviations from normal execution. Of note, in some embodiments, state input information can be comprised in, and received via, control data 306.

CAC 330 can comprise interrupt component 334 that can determine interruption of typical network communications between TC 302 and TPC 304 via NWFC 310 to enable insertion of fuzzed data 362 into the communications between TC 302 and TPC 304. In an aspect, interrupt component 334 can restrict typical communication from TPC 304 to TC 302 via NWFC 310 at a state input point. In an embodiment, interrupt component 334 can receive a message intended for TC 302. This message can be stored but not allowed to pass to TC 302. This interrupted message can then be substituted with fuzzed data 362 as determined by FC 340. In some embodiments, fuzzing can comprise delaying propagation of a typical communication to determine a result of the delay on the execution of the software target of TC 302. In these embodiments, interrupt component 334 can receive a message intended for TC 302. This message can be allowed to pass, e.g., as fuzzed data 362, to TC 302 after a delay, for example, as determined by FC 340.

Fuzzed data 362 can be determined by fuzzing component (FC) 340. In an embodiment, fuzzed data 362 can be premised on an interrupted message from TPC 304 meant for TC 302, e.g., a message interrupted by interrupt component 334. As an example, FC 340 can receive, interrupt, e.g., by 334, and modify, e.g., by FC 340, an "authenticate" message from TPC 304, e.g., at state input point 2 of FIG. 2, and can enable access by TC 302 to the modified "authenticate" message, e.g., as fuzzed data 362. In other embodiments, fuzzed data 362 can be determined independent of an interrupted message from TPC 304 meant for TC 302. As an example, CAC 330 can receive an "authenticate" message from TPC 304, e.g., at state input point 2 of FIG. 2, interrupt this message from being sent to TC 304, e.g., via interrupt component 334, and can substitute a "null" message, etc., e.g., via FC 340, that can be unrelated to a modification of the received "authenticate" message from TPC 304. Of note, NWFC 310 can fuzz test a software target, e.g., software executing on TC 302, by sending nearly any information as fuzzed data 362 at a state input point, e.g., data that is the same as is received via target peer-side communication 350, nearly any modification of data received via target peer-side communication 350, nearly any other data that can be unrelated to data received as via target peer-side communication 350, etc. This can allow for highly flexible fuzz testing of a software target.

Figure 4:
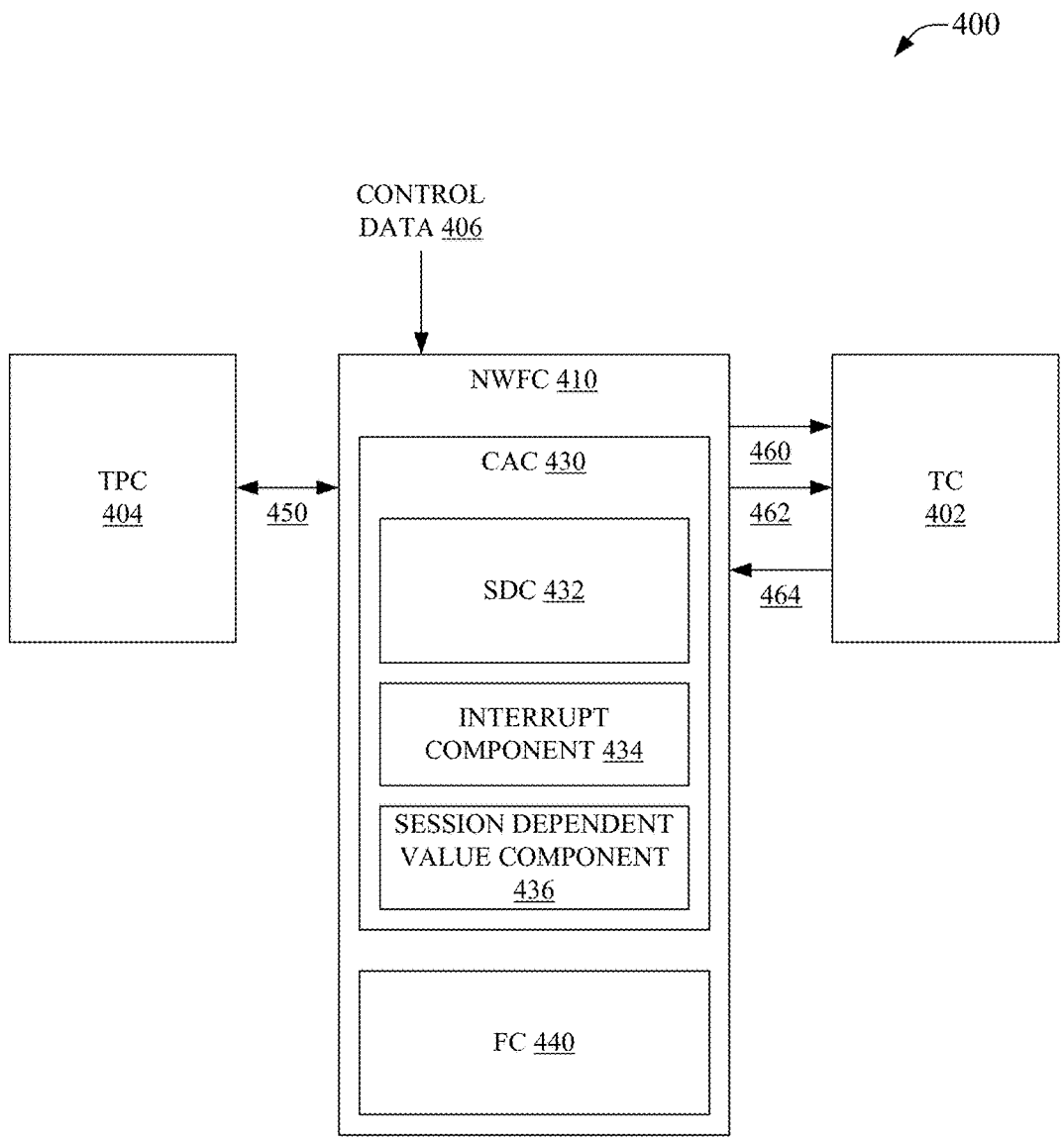
FIG. 4 illustrates a system that facilitates whitebox fuzzing of a networked software target comprising a session dependent value in accordance with aspects of the subject disclosure.

FIG. 4 illustrates a system 400 that facilitates whitebox fuzzing of a networked software target comprising a session dependent value in accordance with aspects of the subject disclosure. System 400 can comprise NWFC 410, which can enable communication of fuzzed data 462, etc., to TC 402. NWFC 410 can receive target-side output communication 464 from TC 402 and can enable access to target-side input communication 460 for TC 402. NWFC 410 can send/receive target peer-side communication 450 to/from TPC 404. In an embodiment, NWFC 410 can pass typical network communications between TC 402 and TPC 404. In an aspect, passing typical network communications, e.g., comprising 450, 460, and 464, between TC 402 and TPC 404 can enable TC 402 and TPC 404 to function as if NWFC 410 is transparent, e.g., typical network communications can be passed without alteration.

In another aspect, the typical network communications can be interrupted, altered, modified, substituted, etc., by NWFC 410 to enable introduction of fuzzed data 462 into the interaction between TC 402 and TPC 404. TC 402 can then respond to TPC 404 based on the fuzzed data 462. In an aspect, enabling access to fuzzed data 462 by TC 402 can result in deviation of software target execution normally premised on the typical network communications between TC 402 and TPC 404, e.g., TC 402 responds to fuzzed data 462 rather that responding to a message that was interrupted by NWFC 410, e.g., a message that would normally have been provided to TC 402 in target-side input communication 460. Deviation in execution resulting from use of fuzzed data 462 can enable determining faults, crashes, errors, etc., resulting from reliance on fuzzed data 462 by TC 402. In an aspect, NWFC 410 can enable typical execution of a software target, e.g., software executing on TC 402, by passing unaltered communication between TC 402 and TPC 404. In a further aspect, NWFC 410 can enable perturbation of a software target by implementing fuzzed data 462 at a state input point of the communication between TC 402 and TPC 404 to enable fuzz testing of a software target, e.g., software executing on TC 402.

In an aspect, NWFC 410 can determine typical communications between TC 402 and TPC 404. In an embodiment, NWFC 410 can receive control data 406 comprising information about typical communications between TC 402 and TPC 404. In another embodiment, NWFC 410 can monitor typical communications between TC 402 and TPC 404 to determine information about the typical communications, normal responses by TC 402 and/or TPC 404, etc. In an aspect, NWFC 410 can comprise CAC 430 to facilitate analysis of monitored communication between TC 402 and TPC 404.

CAC 430 can comprise SDC 432, which can determine one or more state input(s) that can be relevant to fuzz testing of a software target. In an aspect, SDC 432 can determine where a message will be written to a software target executing on TC 402. This write message point can be designated as a state input. Analysis of typical communication between TC 402 and TPC 404, e.g., without fuzzing of data, can enable SDC 432 to determine the state input points. These state input points can then enable fuzz testing of the software target of TC 402 by inserting fuzzed data 462 and analysis of the subsequent software target execution for deviations from normal execution. Of note, in some embodiments, state input information can be comprised in, and received via, control data 406.

CAC 430 can comprise interrupt component 434 that can determine interruption of typical network communications between TC 402 and TPC 404 via NWFC 410 to enable insertion of fuzzed data 462 into the communications between TC 402 and TPC 404. In an aspect, interrupt component 434 can restrict typical communication from TPC 404 to TC 402 via NWFC 410 at a state input point. In an embodiment, interrupt component 434 can receive a message intended for TC 402. This message can be stored but not allowed to pass to TC 402. This interrupted message can then be substituted with fuzzed data 462 as determined by FC 440. In some embodiments, fuzzing can comprise delaying propagation of a typical communication to determine a result of the delay on the execution of the software target of TC 402. In these embodiments, interrupt component 434 can receive a message intended for TC 402. This message can be allowed to pass, e.g., as fuzzed data 462, to TC 402 after a delay, for example, as determined by FC 440.

CAC 430 can comprise session dependent value component 436 that can determine an occurrence of a session dependent token and the corresponding token value. In some embodiments, network protocols can have values that change on each execution of a software target execution or process. As an example, a server can provide a connection identifier that is a random number. This identifier can be included with each message between the server and a client to allow validation of the message. The use of this session dependent value can limit the effectiveness of conventional whitebox fuzzers because they can be unable to produce the session dependent value needed to validate messages sent between the server and the client. In contrast to conventional whitebox fuzzers, the presently disclosed subject matter can identify a session dependent token, e.g., a conditionals, identifier, etc., and a corresponding token value, that can change on each iteration of the software target executing. The corresponding token value can be captured from the unaltered communication between TC 402 and TPC 404 before a state input that will be fuzz tested. As an example, where a random number is used as a connection identifier between TC 402 and TPC 404, this connection identifier can be included in a message between TC 402 and TPC 404. This connection identifier can be captured and identified as a session dependent token value such that where the session dependent token value is needed to validate fuzzed data 462 inserted at a state input point, the token value can be provided by session dependent value component 436 as part of fuzzed data 462 generated by FC 440. In an aspect, session dependent value component 436 can determine if a conditional is being compared in packet data being communicated between TC 402 and TPC 404 via NWFC 410, which can enable session dependent value component 436 to determine the presence of a session dependent token and a corresponding value from normal communication between TC 402 and TPC 404. Session dependent value component 436 can further determine that the token value in packets changes on each execution, which can enable session dependent value component 436 to determine that token value is to be stored for each iteration of the execution to enable validation during fuzz testing. Thereafter, session dependent value component 436 can enable use of the token data instead to enable validation of the fuzz data when a session dependent token is indicated as part of a communication between TC 402 and TPC 404 in relation to providing fuzzed data 462.

Fuzzed data 462 can be determined by fuzzing component (FC) 440. In an embodiment, fuzzed data 462 can be premised on an interrupted message from TPC 404 meant for TC 402, e.g., a message interrupted by interrupt component 434. As an example, FC 440 can receive, interrupt, and modify an "authenticate" message from TPC 404, and can enable access by TC 402 to the modified "authenticate" message. In other embodiments, fuzzed data 462 can be determined independent of an interrupted message from TPC 404 meant for TC 402. As an example, CAC 430 can receive an "authenticate" message from TPC 404, interrupt this message from being sent to TC 404, e.g., via interrupt component 434, and can substitute a fuzzed message, etc., e.g., via fuzzed data 462 determined by FC 440, that can be unrelated to a modification of the received "authenticate" message from TPC 404. Of note, NWFC 410 can fuzz test a software target, e.g., software executing on TC 402, by sending nearly any information as fuzzed data 462 at a state input point, e.g., data that is the same as is received via target peer-side communication 450, nearly any modification of data received via target peer-side communication 450, nearly any other data that can be unrelated to data received as via target peer-side communication 450, etc. This can allow for highly flexible fuzz testing of a software target.

Figure 5:
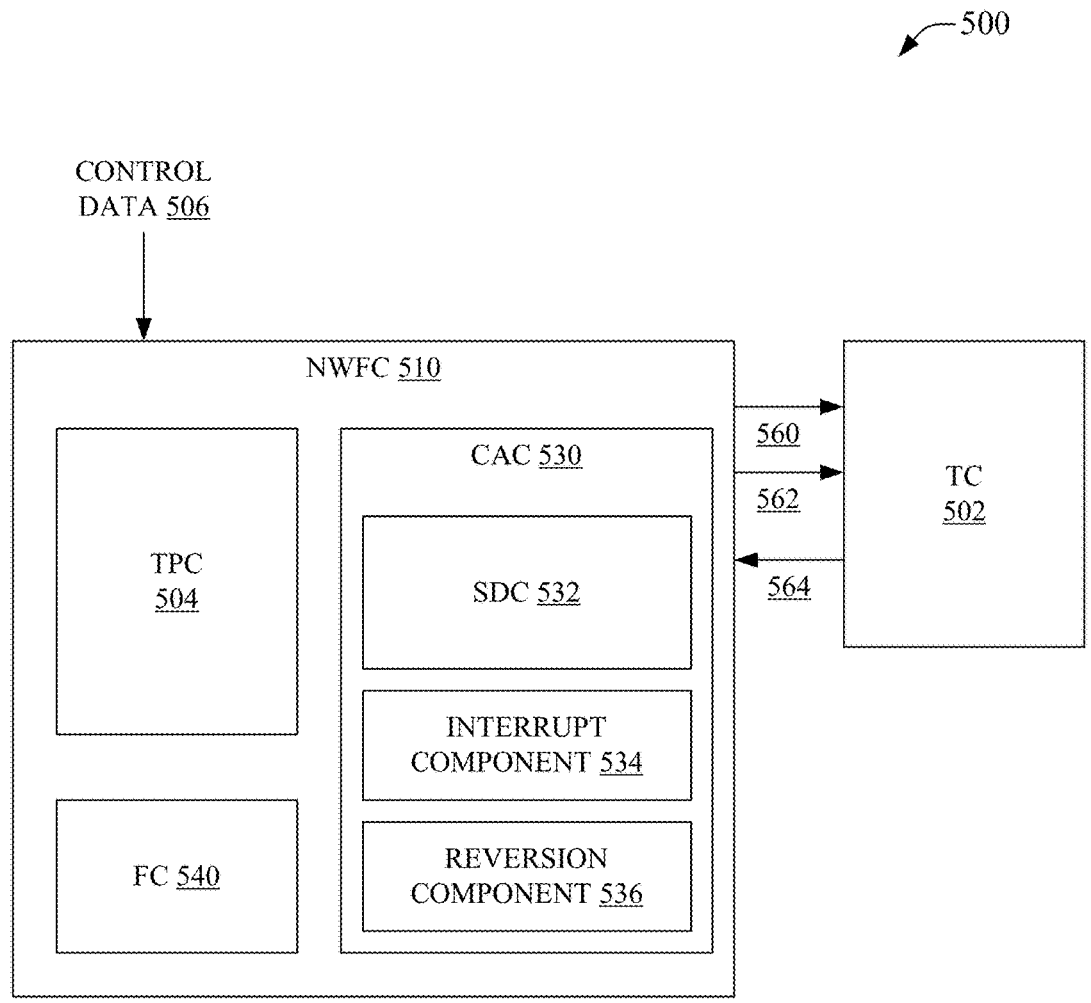
FIG. 5 illustrates a system that facilitates whitebox fuzzing of a networked software target comprising reversion in accordance with aspects of the subject disclosure.

FIG. 5 is a depiction of a system 500 that facilitates whitebox fuzzing of a networked software target comprising reversion in accordance with aspects of the subject disclosure. System 500 can comprise NWFC 510, which can enable communication of fuzzed data 562, etc., to TC 502. NWFC 510 can receive target-side output communication 564 from TC 502 and can enable access to target-side input communication 560 for TC 502. NWFC 510 can send/receive target peer-side communication to/from TPC 504. In an embodiment, NWFC 510 can comprise TPC 504. In some embodiments, TPC 504 can be a virtualized embodiment of a target network peer device that can be the same as, or similar to, TPC 104, 304, 404, etc. NWFC 510 can pass typical network communications between TC 502 and TPC 504. In an aspect, passing typical network communications, e.g., comprising 560 and 564, between TC 502 and TPC 504 can enable TC 502 and TPC 504 to function as if NWFC 510 is transparent in a communication network, e.g., typical network communications are passed without alteration.

In another aspect, the typical network communications can be interrupted, altered, modified, substituted, etc., by NWFC 510 to enable introduction of fuzzed data 562 into the interaction between TC 502 and TPC 504. TC 502 can then respond to TPC 504 based on the fuzzed data 562. In an aspect, enabling access to fuzzed data 562 by TC 502 can result in deviation of software target execution normally premised on the typical network communications between TC 502 and TPC 504, e.g., TC 502 responds to fuzzed data 562 rather that responding to a message that was interrupted by NWFC 510, e.g., that would normally have been provided to TC 502 in target-side input communication 560. Deviation in execution resulting from use of fuzzed data 562 can enable determining faults, crashes, errors, etc., resulting from reliance on fuzzed data 562 by TC 502. In an aspect, NWFC 510 can enable typical execution of a software target, e.g., software executing on TC 502, by passing unaltered communication between TC 502 and TPC 504. In a further aspect, NWFC 510 can enable perturbation of a software target by implementing fuzzed data 562 at a state input point of the communication between TC 502 and TPC 504 to enable fuzz testing of a software target, e.g., software executing on TC 502.

In an aspect, NWFC 510 can determine typical communications between TC 502 and TPC 504. In an embodiment, NWFC 510 can receive control data 506 comprising information about typical communications between TC 502 and TPC 504. In another embodiment, NWFC 510 can monitor typical communications between TC 502 and TPC 504 to determine information about the typical communications, normal responses by TC 502 and/or TPC 504, etc. In an aspect, NWFC 510 can comprise CAC 530 to facilitate analysis of monitored communication between TC 502 and TPC 504.

CAC 530 can comprise SDC 532, which can determine one or more state input(s) that can be relevant to fuzz testing of a software target. In an aspect, SDC 532 can determine where a message will be written to a software target executing on TC 502. This write message point can be designated as a state input. Analysis of typical communication between TC 502 and TPC 504, e.g., without fuzzing of data, can enable SDC 532 to determine the state input points. These state input points can then enable fuzz testing of the software target of TC 502 by inserting fuzzed data 562 and analysis of the subsequent software target execution for deviations from normal execution. Of note, in some embodiments, state input information can be comprised in, and received via, control data 506.

CAC 530 can comprise interrupt component 534 that can determine interruption of typical network communications between TC 502 and TPC 504 via NWFC 510 to enable insertion of fuzzed data 562 into the communications between TC 502 and TPC 504. In an aspect, interrupt component 534 can restrict typical communication from TPC 504 to TC 502 via NWFC 510 at a state input point. In an embodiment, interrupt component 534 can receive a message intended for TC 502. This message can be stored but not allowed to pass to TC 502. This interrupted message can then be substituted with fuzzed data 562 as determined by FC 540. In some embodiments, fuzzing can comprise delaying propagation of a typical communication to determine a result of the delay on the execution of the software target of TC 502. In these embodiments, interrupt component 534 can receive a message intended for TC 502. This message can be allowed to pass, e.g., as fuzzed data 562, to TC 502 after a delay, for example, as determined by FC 540.

CAC 530 can comprise reversion component 536 that can enable reversion of an instance of a software target. This can increase the speed of fuzz testing by reducing the amount of time a software target spends in execution of normal message communication up to a determined state input point. As an example, where a state input occurs after several hundred messages are communicated between a client and a server for an instance of the software target in execution, it can be more efficient to revert the instance to the state input point rather than re-executing the exchange and execution of the several hundred messages between the client and the server. In an aspect, where TPC 504 is a virtual instance of a target network peer device, the virtual instance can, in a sense, be rolled back to the state input point to test additional fuzzed data 562 between TPC 504 and TC 502. This rolling back, e.g., reversion, can be enabled by determinations from reversion component 536.

In some embodiments, a determination can be made based on where in the exchange of messages between TC 502 and TPC 504 a state input point is located. Where the state input point is early in an exchange of messages, reversion can be associated with negligible time savings, e.g., it can be faster to re-run the communications than to revert to the state input, it can be the same time to re-run the communication as to revert to the state input, etc. However, where the state input point is sufficiently advanced into the communication exchange between TC 502 and TPC 504, reversion can offer a faster path to a next fuzzable iteration. In an aspect, reversion component 536 can determine if a time savings can occur as a result of reversion and, where the result of the determination satisfies a time savings rule, can trigger reversion rather than re-running the communication exchange for a next iteration of fuzz testing.

Fuzzed data 562 can be determined by fuzzing component (FC) 540. In an embodiment, fuzzed data 562 can be premised on an interrupted message from TPC 504 meant for TC 502, e.g., a message interrupted by interrupt component 534. As an example, FC 540 can receive, interrupt, e.g., by 534, and modify, e.g., by FC 540, an "authenticate" message from TPC 504, e.g., at state input point 2 of FIG. 2, and can enable access by TC 502 to the modified "authenticate" message, e.g., as fuzzed data 562. In other embodiments, fuzzed data 562 can be determined independent of an interrupted message from TPC 504 meant for TC 502. As an example, CAC 530 can receive an "authenticate" message from TPC 504, e.g., at state input point 2 of FIG. 2, interrupt this message from being sent to TC 504, e.g., via interrupt component 534, and can substitute a "null" message, etc., e.g., via FC 540, that can be unrelated to a modification of the received "authenticate" message from TPC 504. Of note, NWFC 510 can fuzz test a software target, e.g., software executing on TC 502, by sending nearly any information as fuzzed data 562 at a state input point, e.g., data that is the same as is received via target peer-side communication, nearly any modification of data received via target peer-side communication, nearly any other data that can be unrelated to data received as via target peer-side communication, etc. This can allow for highly flexible fuzz testing of a software target.

Figure 6:
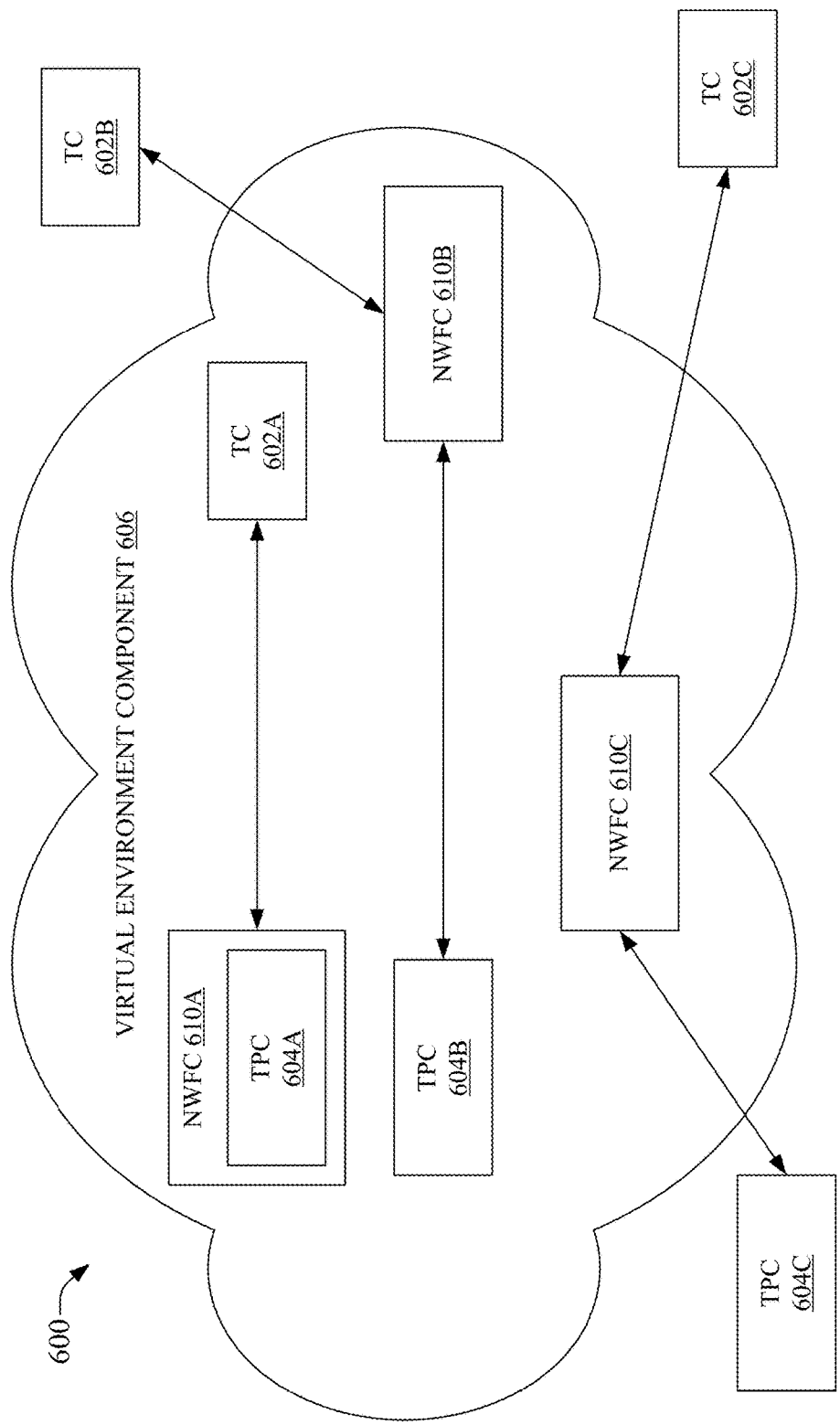
FIG. 6 is a depiction of examples of whitebox fuzzing of a networked software target comprising a virtualized component in accordance with aspects of the subject disclosure.

FIG. 6 is a depiction of examples 600 of whitebox fuzzing of a networked software target comprising a virtualized component in accordance with aspects of the subject disclosure. System 600 can comprise virtual environment component 606 that can be a complete substitute for a real machine and can provide a level of functionality required for the execution of a complete operating system such that virtual environment component 606 can emulate a computer system or computerized device such as a NWFC, TC, TPC, etc. As such, virtual environment component 606 can enable virtualized operation and/or execution of whitebox fuzzers disclosed in systems 100, 200, 300, 400, 500, etc. In an embodiment, virtual environment component 606 can comprise NWFC 610A that can comprise TPC 604A. NWFC 610A can enable communication of fuzzed data, etc., to TC 602A. NWFC 610A can receive target-side output communication from TC 602A and can enable access to target-side input communication for TC 602A. NWFC 610A can send/receive target peer-side communication to/from TPC 604A. In an embodiment, NWFC 610A can pass typical network communications between TC 602A and TPC 604A. In an aspect, passing typical network communications between TC 602A and TPC 604A can enable TC 602A and TPC 604A to function as if NWFC 610A is transparent in a communication network, e.g., typical network communications are passed without alteration.

In another aspect, the typical network communications can be interrupted, altered, modified, substituted, etc., by NWFC 610A to enable introduction of fuzzed data into the interaction between TC 602A and TPC 604A. TC 602A can then respond to TPC 604A based on the fuzzed data. In an aspect, enabling access to fuzzed data by TC 602A can result in deviation of software target execution normally premised on the typical network communications between TC 602A and TPC 604A, e.g., TC 602A can respond to fuzzed data rather that responding to a message that was interrupted by NWFC 610A. Deviation in execution resulting from use of fuzzed data can enable determining faults, crashes, errors, etc., resulting from reliance on fuzzed data by TC 602A. In an aspect, NWFC 610A can enable typical execution of a software target, e.g., software executing on TC 602A, by passing unaltered communication between TC 602A and TPC 604A. In a further aspect, NWFC 610A can enable perturbation of a software target by implementing fuzzed data at a state input point of the communication between TC 602A and TPC 604A to enable fuzz testing of a software target, e.g., software executing on TC 602A. In an embodiment, NWFC 610A can operate in a fully virtualized environment, via virtual environment component 606, that emulates a real-world system that can be the same as, or similar to, system 100, 200, 300, 400, 500, etc., to enable fuzz testing as disclosed herein.

System 600, in other embodiments, can comprise a mix of virtualized and real-world components to enable fuzz testing as disclosed herein. As such, virtual environment component 606 can, in some embodiments, comprise NWFC 610B that can be the same as, or similar to, NWFC 610A. NWFC 610B can enable communication of fuzzed data, etc., to TC 602B. NWFC 610B can receive target-side output communication from TC 602B, which can be embodied in a real-world device outside of virtual environment component 606, and can enable access to target-side input communication for TC 602B. NWFC 610B can send/receive target peer-side communication to/from TPC 604B, which can be embodied in a virtual device within a virtual environment that can be supported by virtual environment component 606. In an embodiment, NWFC 610B can pass typical network communications between TC 602B and TPC 604B. In an aspect, passing typical network communications between TC 602B and TPC 604B can enable TC 602B and TPC 604B to function as if NWFC 610B is transparent in a communication network, e.g., typical network communications are passed without alteration.

In another aspect, the typical network communications can be interrupted, altered, modified, substituted, etc., by NWFC 610B to enable introduction of fuzzed data into the interaction between TC 602B and TPC 604B. TC 602B can then respond to TPC 604B based on the fuzzed data. In an aspect, enabling access to fuzzed data by TC 602B can result in deviation of software target execution normally premised on the typical network communications between TC 602B and TPC 604B, e.g., TC 602B can respond to fuzzed data rather that responding to a message that was interrupted by NWFC 610B. Deviation in execution resulting from use of fuzzed data can enable determining faults, crashes, errors, etc., resulting from reliance on fuzzed data by TC 602B. In an aspect, NWFC 610B can enable typical execution of a software target, e.g., software executing on TC 602B, by passing unaltered communication between TC 602B and TPC 604B. In a further aspect, NWFC 610B can enable perturbation of a software target by implementing fuzzed data at a state input point of the communication between TC 602B and TPC 604B to enable fuzz testing of a software target, e.g., software executing on TC 602B. In an embodiment, NWFC 610B can operate in a virtualized environment, via virtual environment component 606, that emulates a real-world system that can be the same as, or similar to, system 100, 200, 300, 400, 500, etc., to enable fuzz testing as disclosed herein.

In an embodiment, virtual environment component 606 can comprise NWFC 610C that can be the same as, or similar to, NWFC 610A, 610B, etc. NWFC 610C can enable communication of fuzzed data, etc., to TC 602C, which can be embodied in a real-world device outside of virtual environment component 606. NWFC 610C can receive target-side output communication from TC 602C and can enable access to target-side input communication for TC 602C. NWFC 610C can send/receive target peer-side communication to/from TPC 604C, which can also be embodied in a real-world device outside of virtual environment component 606. In an embodiment, NWFC 610C can pass typical network communications between TC 602C and TPC 604C. In an aspect, passing typical network communications between TC 602C and TPC 604C can enable TC 602C and TPC 604C to function as if NWFC 610C is transparent in a communication network, e.g., typical network communications are passed without alteration.

In another aspect, the typical network communications can be interrupted, altered, modified, substituted, etc., by NWFC 610C to enable introduction of fuzzed data into the interaction between TC 602C and TPC 604C. TC 602C can then respond to TPC 604C based on the fuzzed data. In an aspect, enabling access to fuzzed data by TC 602C can result in deviation of software target execution normally premised on the typical network communications between TC 602C and TPC 604C, e.g., TC 602C can respond to fuzzed data rather that responding to a message that was interrupted by NWFC 610C. Deviation in execution resulting from use of fuzzed data can enable determining faults, crashes, errors, etc., resulting from reliance on fuzzed data by TC 602C. In an aspect, NWFC 610C can enable typical execution of a software target, e.g., software executing on TC 602C, by passing unaltered communication between TC 602C and TPC 604C. In a further aspect, NWFC 610C can enable perturbation of a software target by implementing fuzzed data at a state input point of the communication between TC 602C and TPC 604C to enable fuzz testing of a software target, e.g., software executing on TC 602C. In an embodiment, NWFC 610C can operate in a virtualized environment, via virtual environment component 606, that emulates a real-world system that can be the same as, or similar to, system 100, 200, 300, 400, 500, etc., to enable fuzz testing as disclosed herein.

Figure 7:
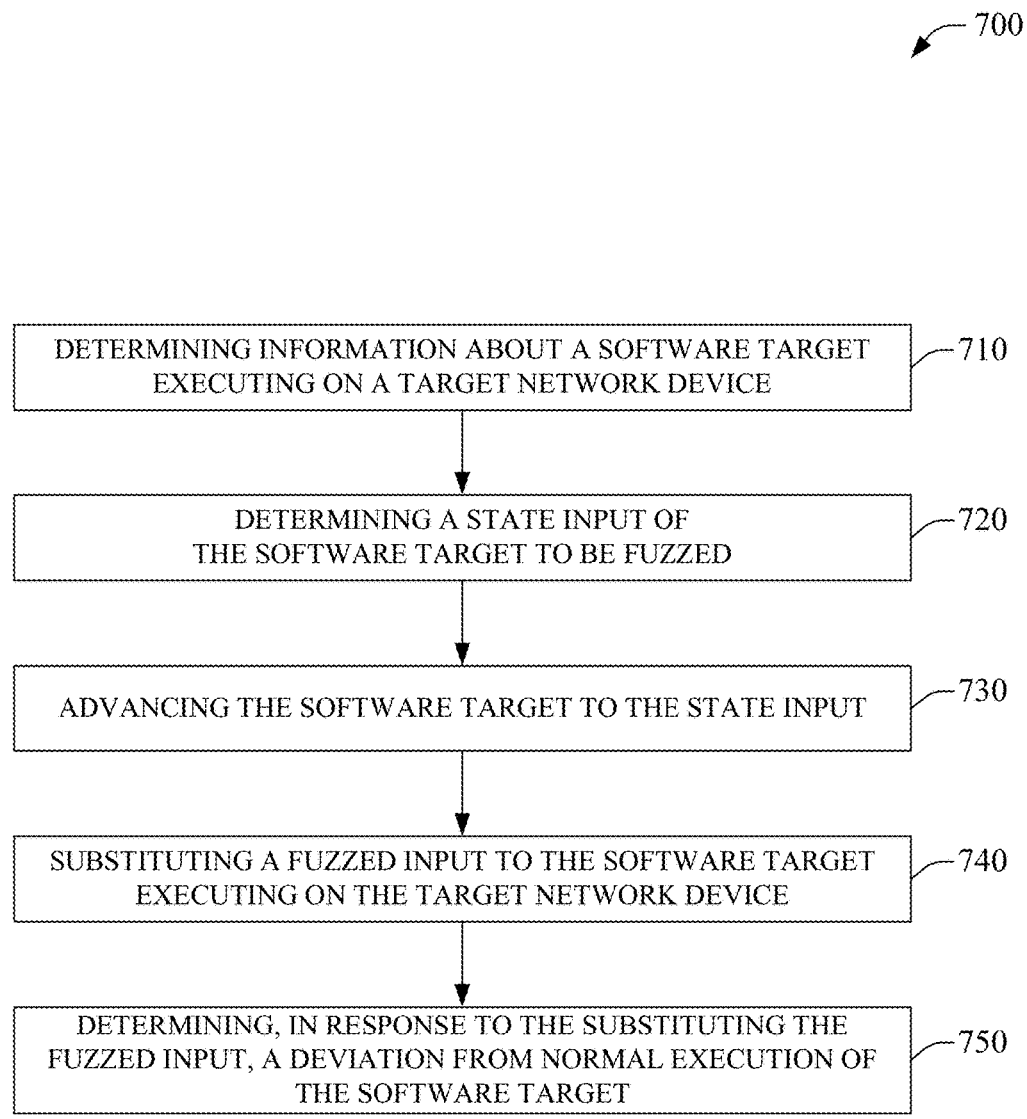
FIG. 7 illustrates a method for facilitating whitebox fuzzing of a networked software target in accordance with aspects of the subject disclosure.
Figure 8:
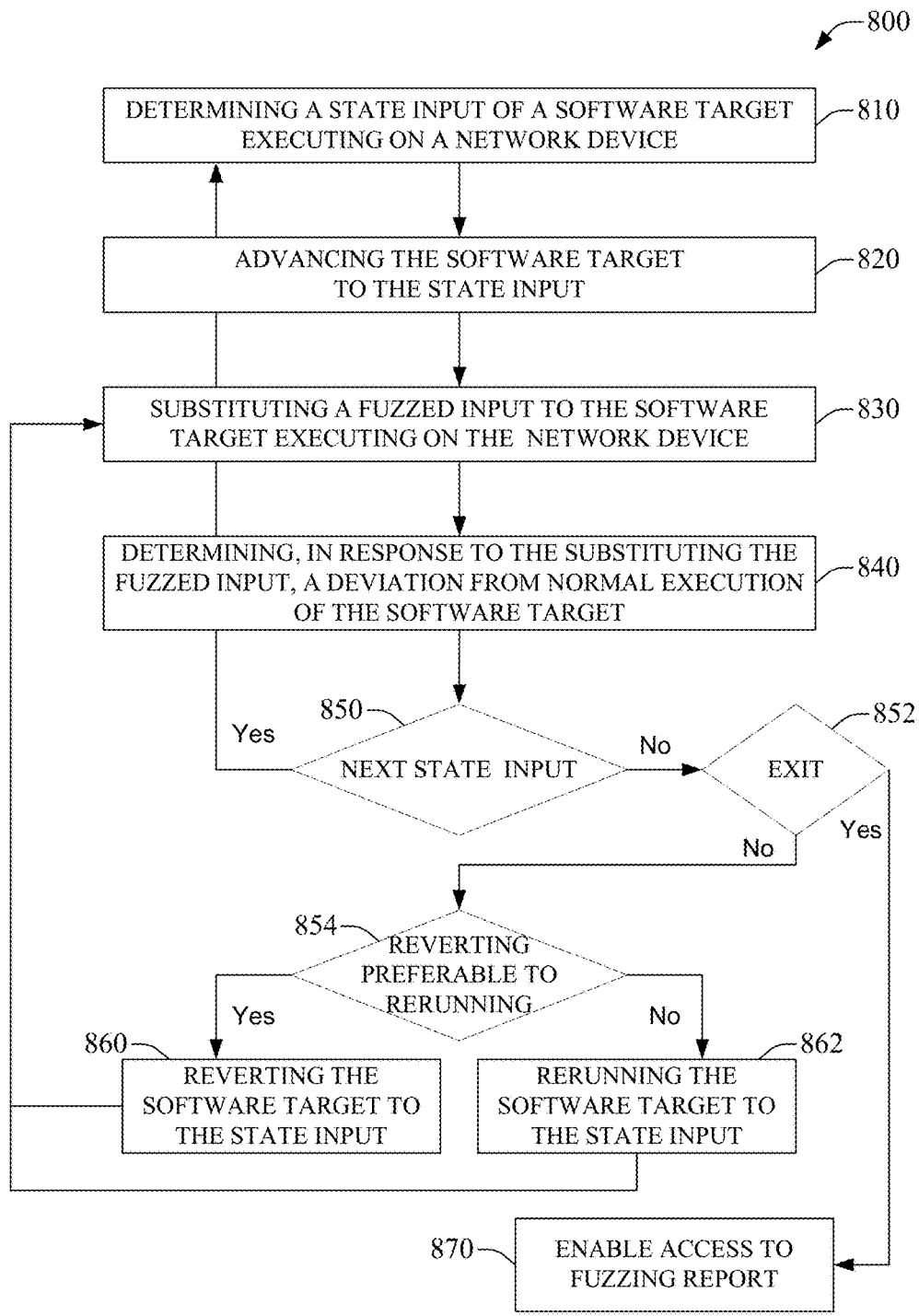
FIG. 8 illustrates a method for facilitating whitebox fuzzing of a networked software target comprising reversion in accordance with aspects of the subject disclosure.
Figure 9:
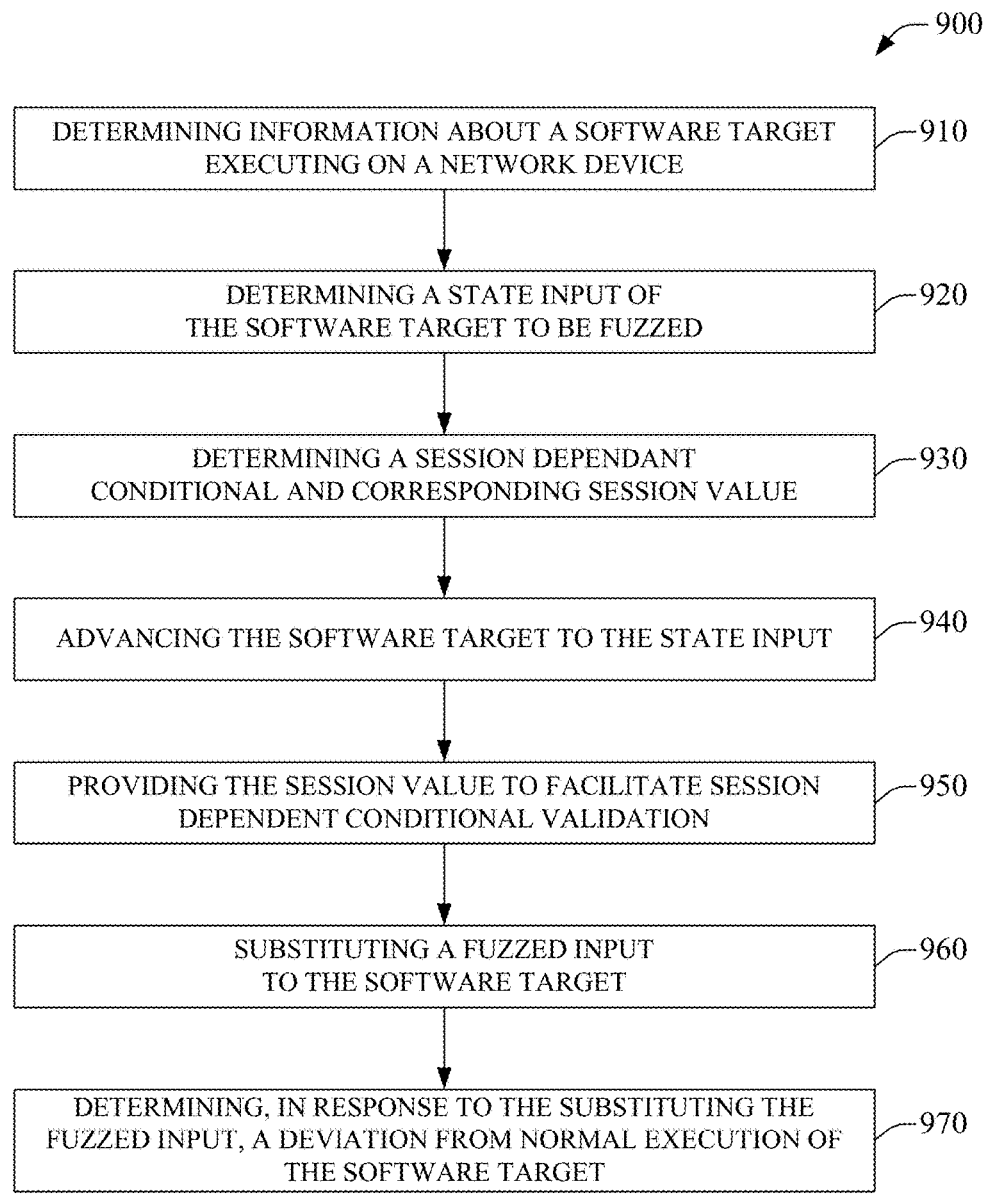
FIG. 9 illustrates a method for facilitating whitebox fuzzing of a networked software target comprising a session dependent variable in accordance with aspects of the subject disclosure.

In view of the example system(s) described above, example method(s) that can be implemented in accordance with the disclosed subject matter can be better appreciated with reference to flowcharts in FIG. 7-FIG. 9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates aspects of method 700 facilitating white-box fuzzing of a networked software target in accordance with aspects of the subject disclosure. At 710, a method 700 can determine information about a software target executing on a target network device. The information can comprise information related to typical communications between the target network device, e.g., TC 102-502, etc., and a target network device peer, e.g., TPC 104-504, etc. In an embodiment, system 700, at 710, can determine this information by receiving data comprising information about typical communications between a TC and a TPC. In other embodiments system 700, at 710, can determine this information by monitoring and analyzing typical communications between a TC and a TPC to determine the information.

At 720, system 700 can comprise, determining a state input of the software target to be fuzzed. One or more state input(s) can be relevant to fuzz testing of the software target. In an aspect, a state input can be associated with determining at what point in a communications protocol a message will be written to the software target in execution of the target network device. This write message point can be designated as a state input. Analysis of typical communication between a TC and a TPC, e.g., without fuzzing of data, can be analyzed to find where write operations to the software target occur and thus a state input point(s) can be determined. These state input points can then enable fuzz testing of the software target of a TC by indicating where fuzzed data is to be inserted. Analysis of the subsequent software target execution for deviations from normal execution can then be employed to determine correlations with inserted fuzzed data to indicate features of the software target, e.g., flaws, errors, etc. Of note, in some embodiments, state input information can be provided based on an external analysis of the operation of the TC and TPC, a model of the TC and TPC interactions, etc.

At 730, system 700 can comprise, advancing the software target to the state input determined at 720. In an aspect, the advancing can allow normal operations between a TC and TPC to begin and continue until the state input is reached, at which point, the normal operations can be interrupted to allow insertion of fuzzed data, before normal operations are resumed to study the effect of the inserted fuzzed data.

System 700, at 740, can comprise substituting a fuzzed input to the software target executing on the target network device. As disclosed elsewhere herein, the state input point can be associated with a point just prior to a next write action to the software target. As such, when the software target is advance, at 730, to the state input, the software target is typically ready to receive a next write command from a TPC. At this point, a fuzzed input can be substituted and/or inserted into the write operation to the software target. In an embodiment, fuzzed data can be premised on an interrupted message from a TPC meant for a TC. As an example, an "authenticate" message from a TPC, e.g., at state input point 2 of FIG. 2, can be interrupted and substituted with a modified "authenticate" message, e.g., as fuzzed data. In other embodiments, fuzzed data can be determined independent of an interrupted message from a TPC at the state input. As an example, an "authenticate" message from a TPC, e.g., at state input point 2 of FIG. 2, can be interrupted and substituted with a "null" message, etc., which can be unrelated to a modification of the received "authenticate" message from the TPC.

In response to the substituting the fuzzed input at the write operation following the state input, at 750, method 700 can comprise, determining a deviation from normal execution of the software target. At this point, method 700 can end. Of note, method 700 can fuzz test a software target, e.g., software executing on a TC, by sending nearly any information as fuzzed data at a state input point, e.g., data that is the same as is received via target peer-side communication, nearly any modification of data received via target peer-side communication, nearly any other data that can be unrelated to data received as via target peer-side communication, etc. This can allow for highly flexible fuzz testing of a software target.

FIG. 8 illustrates aspects of method 800 facilitating white-box fuzzing of a networked software target comprising reversion in accordance with aspects of the subject disclosure. At 810, method 800 can include determining a state input of a software target executing on a target network device. One or more state input(s) can be relevant to fuzz testing of the software target. In an aspect, a state input can be associated with determining at what point in a communications protocol a message will be written to the software target in execution of the target network device. This write message point can be designated as a state input. Analysis of typical communication between a TC and a TPC, e.g., without fuzzing of data, can be analyzed to find where write operations to the software target occur and thus a state input point(s) can be determined. This state input point(s) can then enable fuzz testing of the software target of a TC by indicating where fuzzed data is to be inserted. Analysis of the subsequent software target execution for deviations from normal execution can then be employed to determine correlations with inserted fuzzed data to indicate features of the software target, e.g., flaws, errors, etc. Of note, in some embodiments, state input information can be provided based on an external analysis of the operation of the TC and TPC, a model of the TC and TPC interactions, etc.

At 820, system 800 can comprise, advancing the software target to the state input determined at 810. In an aspect, the advancing can allow normal operations between a TC and TPC to begin and continue until the state input is reached, at which point, the normal operations can be interrupted to allow insertion of fuzzed data, before normal operations are resumed to study the effect of the inserted fuzzed data.

System 800, at 830, can comprise substituting a fuzzed input to the software target executing on the target network device. As disclosed elsewhere herein, the state input point can be associated with a point just prior to a next write action to the software target. As such, when the software target is advanced, at 820, to the state input, the software target on a TC is typically ready to receive a next write command from a TPC. At this point, a fuzzed input can be substituted and/or inserted into the write operation to the software target. In an embodiment, fuzzed data can be premised on an interrupted message from a TPC meant for a TC. As an example, an "authenticate" message from a TPC, e.g., at state input point 2 of FIG. 2, can be interrupted and substituted with a modified "authenticate" message, e.g., as fuzzed data. In other embodiments, fuzzed data can be determined independent of an interrupted message from a TPC at the state input. As an example, an "authenticate" message from a TPC, e.g., at state input point 2 of FIG. 2, can be interrupted and substituted with a "null" message, etc., which can be unrelated to a modification of the received "authenticate" message from the TPC.

In response to the substituting the fuzzed input at the write operation following the state input, at 840, method 800 can comprise, determining a deviation from normal execution of the software target. Changes in the execution of the software target can be associated with the fuzzed data provided.

At 850, method 800 can determine if fuzz testing should advance to a next state input. If a condition is determined to satisfy a rule related to advancing the fuzz testing to a next state input, method 800 can return to 810 to determine which next state input is to be fuzz tested. This can loop method 800 to test each determined state input of a software target. Where advancing to a next state input is not indicated, method 800 can determine at 852 if method 800 should end. If it is determined that method 800 should end, e.g., all state inputs of interest have been sufficiently fuzzed, a substantial error has been noted, a determined amount of time has elapsed, a determined amount of computing resources have been consumed, a fault detection rate has transitioned a determined threshold, etc., then method 800 can, at 870, enable access to a fuzzing report comprising information related to the fuzzing performed by method 800. At this point method 800 can end. However, where it is determined at 852 that method 800 should not end, method 800 can, at 854, determine if reverting is preferable to rerunning.

At 854, the determination related to reverting or rerunning can be related to determining which is preferable based on one or more rules, e.g., which is faster, which is less costly, etc. In an aspect, reversion can increase a speed of fuzz testing by reducing an amount of time a software target spends in execution of normal message communication up to a determined state input point. As an example, where a state input occurs after several thousand messages are communicated between a client and a server for an instance of the software target in execution, it can be more efficient to revert the instance to the state input point rather than re-executing the exchange and execution of the several thousand messages between the client and the server. In an aspect, a virtual target network peer device can be, in a sense, rolled back to the state input point to test additional fuzzed data. This rolling back, e.g., reversion, can be based on various metrics. In some embodiments, a determination can be made based on where in the exchange of messages between a TC and a TPC a state input point is located. Where the state input point is early in an exchange of messages, reversion can be associated with negligible time savings, e.g., it can be faster to re-run the communications than to revert to the state input, it can be the same time to re-run the communication as to revert to the state input, etc. However, where the state input point is sufficiently advanced into the communication exchange between a TC and a TPC, reversion can offer a faster path to a next fuzzable iteration. In an aspect, a metric can be used to determine if a time savings can occur as a result of reversion and, where the result of the determination satisfies a time savings rule, can trigger reversion, e.g., at 860, rather than re-running the communication exchange for a next iteration of fuzz testing. Similarly, where reversion is not deemed preferable, re-running the communication exchange, e.g., at 862, can be selected.

At 860, reverting the software target to the state input can occur in method 800. At 862, rerunning the software target to the state input can occur. Method 800 can move to 860 or 862 based on a determination at 854. From both 860 and 862, method 800 can return to 830. At 830, another fuzzed input can be substituted into the reverted or re-run software target at the state input point. This portion of method 800 enables continued fuzz testing of a particular state input. In an aspect, method 800 can continue testing a particular state input with fuzzed data because method 800 has not advanced to a next state input at 850, has not exited method 800 at 852, and has either reverted or re-run the software target to the particular state input as a result of 854. Of note, 854 enables sequential fuzzing of a particular state input of the software target, 850 enables fuzzing of a next state input, and 852 enables reporting out of the results of the fuzzing for the one or more iterations, e.g., via 854, of the one or more state inputs, e.g., via 850, of the software target.

Analysis of deviation from normal operation can provide insight into software flaws based on errors, faults, flaws, loops, software hangs, or even continued normal execution where a fault would normally be expected, etc. The results of analysis on the deviations correlated to the fuzzed inputs can be compiled and reported out, e.g., to software developers, etc., to allow for study of the noted events, repair of the code, patching, etc. Of note, method 800 can fuzz test a software target, e.g., software executing on a TC, by sending nearly any information as fuzzed data at a state input point, e.g., data that is the same as is received via target peer-side communication, nearly any modification of data received via target peer-side communication, nearly any other data that can be unrelated to data received as via target peer-side communication, etc. This can allow for highly flexible fuzz testing of a software target.

FIG. 9 illustrates aspects of method 900 facilitating whitebox fuzzing of a networked software target comprising a session dependent variable in accordance with aspects of the subject disclosure. At 910, method 900 can determine information about a software target executing on a target network device. The information can comprise information related to typical communications between the target network device, e.g., TC 102-502, etc., and a target network device peer, e.g., TPC 104-504, etc. In an embodiment, system 900, at 910, can determine this information by receiving data comprising information about typical communications between a TC and a TPC. In other embodiments system 900, at 910, can determine this information by monitoring and analyzing typical communications between a TC and a TPC to determine the information.

At 920, system 900 can comprise, determining a state input of the software target to be fuzzed. One or more state input(s) can be relevant to fuzz testing of the software target. In an aspect, a state input can be associated with determining at what point in a communications protocol a message will be written to the software target in execution of the target network device. This write message point can be designated as a state input. Analysis of typical communication between a TC and a TPC, e.g., without fuzzing of data, can be analyzed to find where write operations to the software target occur and thus a state input point(s) can be determined. These state input points can then enable fuzz testing of the software target of a TC by indicating where fuzzed data is to be inserted. Analysis of the subsequent software target execution for deviations from normal execution can then be employed to determine correlations with inserted fuzzed data to indicate features of the software target, e.g., flaws, errors, etc. Of note, in some embodiments, state input information can be provided based on an external analysis of the operation of the TC and TPC, a model of the TC and TPC interactions, etc.

At 930, system 900 can comprise, determining a session dependent conditional and corresponding session value. In some embodiments, network protocols can have values that change on each execution of a software target execution or process. As an example, a server can provide a connection identifier that is an identifier. This identifier can be included with each message between the server and a client to allow validation of the message. The use of this session dependent value can limit the effectiveness of conventional whitebox fuzzing methods because they can be unable to produce the session dependent value needed to validate messages sent between the server and the client. In contrast, the presently disclosed subject matter can identify a session dependent conditional and corresponding session value, which can change on each iteration of the software target executing. The corresponding session value can be captured from the unaltered communication between a TC and a TPC before reaching a state input that will be fuzz tested. As an example, where a identifier is used as a session value corresponding to a session dependent conditional in communications between a TC and a TPC, this identifier can be included in a message between the TC and the TPC. This identifier can be captured and identified as a session dependent conditional with a corresponding session value such that, where the session dependent conditional is used to validate an input comprising fuzzed data inserted at a state input point, the session value can be provided in conjunction with the fuzzed data. In an aspect, analysis of typical communication between a Tc and TPC can determine if a session dependent conditional is being compared in packet data being communicated between the TC and the TPC A corresponding session value can be captured from normal communication between the TC and the TPC. The session dependent value can be updated on each execution iteration, which can enable session dependent value to enable validation during each fuzz testing iteration.

At 940, system 900 can comprise, advancing the software target to the state input determined at 920. In an aspect, the advancing can allow normal operations between a TC and TPC to begin and continue until the state input is reached, at which point, the normal operations can be interrupted to allow insertion of fuzzed data, before normal operations are resumed to study the effect of the inserted fuzzed data. At 950, system 900 can comprise, providing the session value to facilitate dependent conditional validation. In an aspect this can be in conjunction with, or as a separate act, from substituting the fuzzed data at 960.

System 900, at 960, can comprise substituting a fuzzed input to the software target executing on the target network device. As disclosed elsewhere herein, the state input point can be associated with a point just prior to a next write action to the software target. As such, when the software target is advanced, at 940, to the state input, the software target is typically ready to receive a next write command from a TPC. At this point, a fuzzed input can be substituted and/or inserted into the write operation to the software target. In an embodiment, fuzzed data can be premised on an interrupted message from a TPC meant for a TC. As an example, an "authenticate" message from a TPC, e.g., at state input point 2 of FIG. 2, can be interrupted and substituted with a modified "authenticate" message, e.g., as fuzzed data. In other embodiments, fuzzed data can be determined independent of an interrupted message from a TPC at the state input. As an example, an "authenticate" message from a TPC, e.g., at state input point 2 of FIG. 2, can be interrupted and substituted with a "null" message, etc., which can be unrelated to a modification of the received "authenticate" message from the TPC.

In response to the substituting the fuzzed input at the write operation following the state input, at 960, method 900 can comprise, determining a deviation from normal execution of the software target. At this point, method 900 can end. Of note, method 900 can fuzz test a software target, e.g., software executing on a TC, by sending nearly any information as fuzzed data at a state input point, e.g., data that is the same as is received via target peer-side communication, nearly any modification of data received via target peer-side communication, nearly any other data that can be unrelated to data received as via target peer-side communication, etc. This can allow for highly flexible fuzz testing of a software target.

Figure 10:
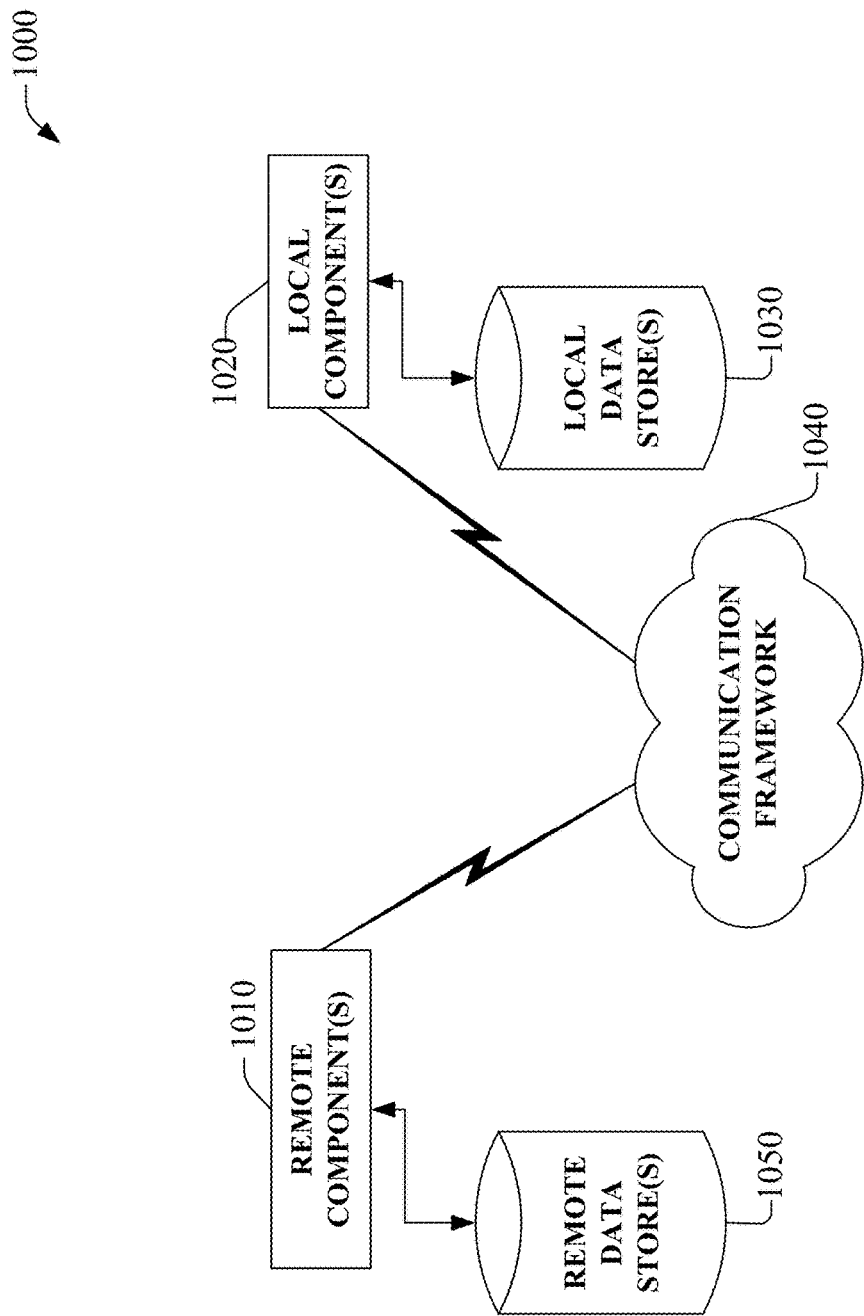
FIG. 10 depicts a schematic block diagram of a sample-computing environment with which the claimed subject matter can interact.

FIG. 10 is a schematic block diagram of a sample-computing environment 1100 with which the claimed subject matter can interact. The system 1000 includes one or more remote component(s) 1010, which, in some embodiments, can include server-side component(s). The remote component(s) 1010 can be hardware and/or software (e.g., threads, processes, computing devices). In some embodiments, remote component(s) 1010 can include TC 102, 302, 402, 502, 602B, 602C, etc., TPC 104, 304, 404, 504, 604B, 604C, etc. As an example, remote component(s) 1010 can be a server computer, located remote from a client computer, which has an interface for receiving fuzzed 162, 262, 362, 462, 562, etc.

The system 1000 also includes one or more local component(s) 1020, which can include client-side component(s). The local component(s) 1020 can be hardware and/or software (e.g., threads, processes, computing devices). In some embodiments, local component(s) 1020 can include NWFC 110, 310, 410, 510 610A, 610B, 610C, etc., TC 602B, 602C, etc., TPC 104, 304, 404, 504, 604A, 604B, 604C, etc.

One possible communication between a remote component(s) 1010 and a local component(s) 1020 can be in the form of a data packet adapted to be transmitted between two or more computer processes. As an example, messages associated with typical network communication between a TC and a TPC, e.g., 150-550, 160-560, 164-564, etc., fuzzed data 162-562, etc., can be communicated between a TC, e.g., a remote component 1010, and TPC via a NWFC, e.g., local component 1020. The system 1000 includes a communication framework 1040 that can be employed to facilitate communications between the remote component(s) 1010 and the local component(s) 1020. The remote component(s) 1010 are operably connected to one or more remote data store(s) 1050 that can be employed to store information on the remote component(s) 1010 side of communication framework 1040. Similarly, the local component(s) 1020 are operably connected to one or more local data store(s) 1030 that can be employed to store information on the to the local component(s) 1020 side of communication framework 1040.

Figure 11:
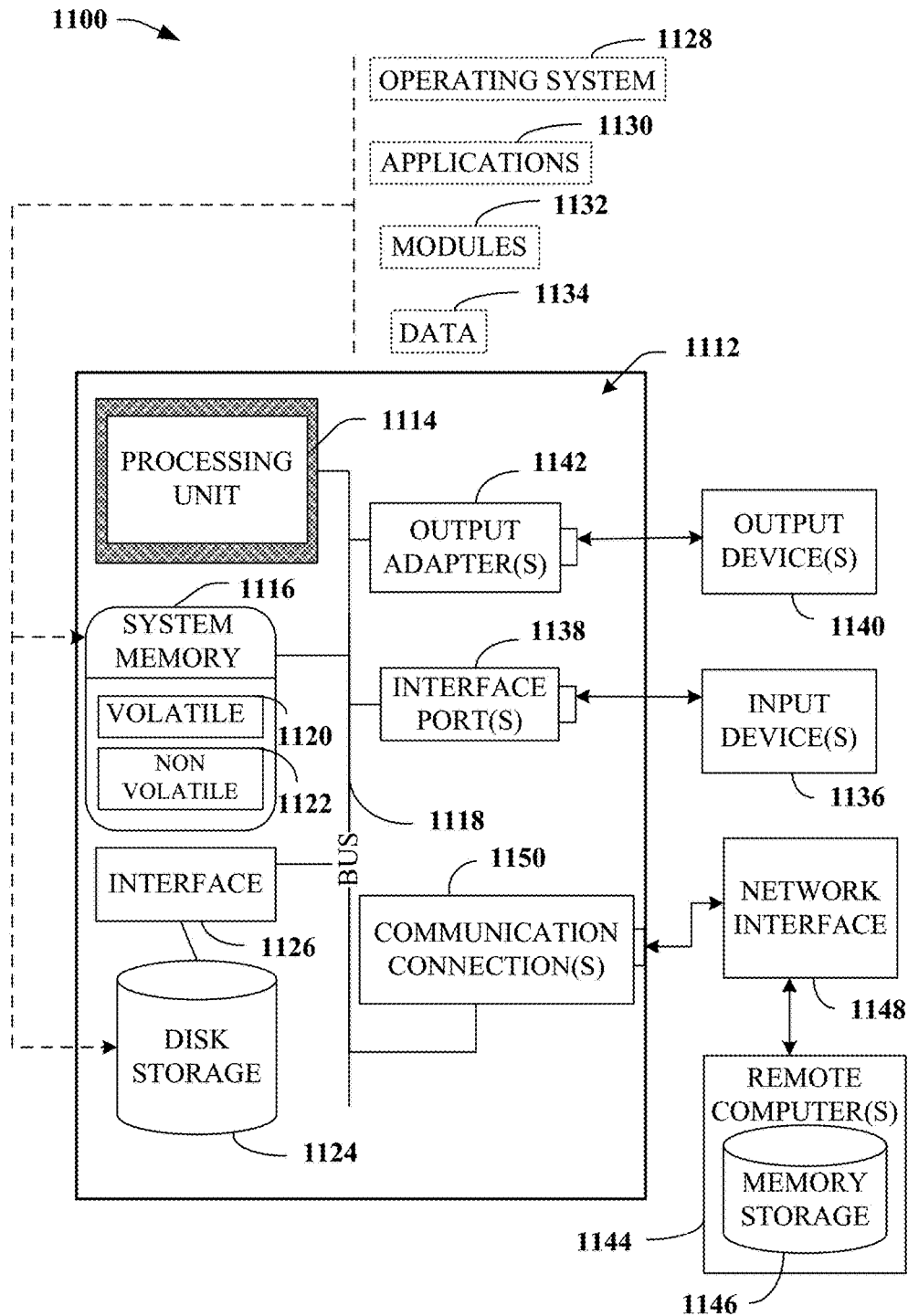
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be employed, for example, by a whitebox fuzz tester component to test a software target, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a user can submit control data, for example to control a number of fuzzing iterations per state input, criteria for selecting a state input to test, fuzzing parameters related to fuzzing data to be passed into the TC at a state input point, e.g., 162, 262, 362, 462, 562, etc., by way of a user interface embodied in a touch sensitive display panel, keyboard, mouse, etc., allowing a user to interact with the fuzzing operations via computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USC), an infrared port, a Bluetooth port, an IP port, or a logical port associated with a wireless service, etc. Output device(s) 1140 use some of the same type of ports as input device(s) 1136.

Thus, for example, a USC port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or C" is intended to mean any of the natural inclusive permutations. That is, if X employs A; X employs C; or X employs both A and C, then "X employs A or C" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
a processor; and
a memory that stores executable instructions that, when executed by the processor, facilitate performance of operations, comprising:
receiving compilable code that, when compiled, results in target executable code;
determining, based on the compilable code, an $N^{th}$ state of the target executable code, wherein N is an integer;
executing the target executable code on a target device to the $N^{th}$ state of the target executable code;
performing a fuzzed input to the target executable code for the $N^{th}$ state of the target executable code;
determining, in response to resuming execution of the target executable code subsequent to performing the fuzzed input to the target executable code for the $N^{th}$ state of the target executable code, a change in behavior of the target executable code as a result of performing the fuzzed input to the target executable code for the $N^{th}$ state of the target executable code; and
enabling access to information related to the change in the behavior of the target executable code as a result of performing the fuzzed input to the target executable code for the $N^{th}$ state of the target executable code, wherein the target device executes a virtualized instance of the target executable code and the performing the fuzzed input to the target executable code for the $N^{th}$ state of the target executable code is performed iteratively by reverting the virtualized instance of the target executable code to the $N^{th}$ state of the target executable code for iterations subsequent to a first iteration rather than re-executing the target executable code to the $N^{th}$ state of the target executable code for iterations subsequent to the first iteration.

2. The system of claim 1, wherein the $N^{th}$ state of the target executable code is a network client input state.

3. The system of claim 1, wherein the $N^{th}$ state of the target executable code is a network server input state.

4. The system of claim 1, wherein the target device is a network client device.

5. The system of claim 4, wherein the target device is a virtualization device executing an instance emulating the network client device.

6. The system of claim 1, wherein the target device is a network server device.

7. The system of claim 6, wherein the target device is a virtualization device executing an instance emulating the network server device.

8. The system of claim 1, wherein the target device comprises a plurality of virtualized instances of the target executable code performing the fuzzed input to the target executable code for the $N^{th}$ state of the target executable code in parallel across the plurality of virtualized instances of the target executable code.

9. The system of claim 8, wherein the performing the fuzzed input to the target executable code for the $N^{th}$ state of the target executable code in parallel allows faster testing of the $N^{th}$ state of the target executable code than is achieved by performing the fuzzed input to the target executable code for the $N^{th}$ state of the target executable code in series.

10. The system of claim 8, wherein the target device is comprised in a cloud computing environment comprising a sharable pool of configurable computing resources provisioning the configurable computing resources on an as requested basis.

11. The system of claim 1, wherein the operations further comprise:
identifying a session dependent conditional state; and
supplying a corresponding value at the session dependent conditional state to execute the target executable code on the target device to the $N^{th}$ state of the target executable code.

12. A method, comprising:
receiving, by a system comprising a processor, information related to execution of a target executable code;
determining, by the system and based on the information, an $N^{th}$ state of the target executable code, wherein N is an integer;
executing, by the system, the target executable code on a target device to the $N^{th}$ state of the target executable code;
substituting, by the system, a fuzzed input for a normal input to the target executable code for the $N^{th}$ state of the target executable code;
determining, by the system, a deviation in behavior of the target executable code as a result of the substituting the fuzzed input for the normal input to the target executable code at the $N^{th}$ state of the target executable code; and
enabling, by the system, access to information related to the deviation in the behavior of the target executable code as a result of the substituting the fuzzed input for the normal input to the target executable code at the $N^{th}$ state of the target executable code, wherein the target device executes a virtualized instance of the target executable code and the substituting the fuzzed input for the normal input to the target executable code for the $N^{th}$ state of the target executable code is performed iteratively by reverting the virtualized instance of the target executable code to the $N^{th}$ state of the target executable code for iterations subsequent to a first iteration rather than re-executing the target executable code to the $N^{th}$ state of the target executable code for iterations subsequent to the first iteration.

13. The method of claim 12, wherein the target device is a client device.

14. The method of claim 12, wherein the target device is a server device.

15. The method of claim 12, wherein the system is a virtualized system.

16. A non-transitory computer readable medium having instructions stored thereon that, in response to execution, cause a system comprising a processor to perform operations, comprising:
receiving information related to execution of a target executable code on a target device and corresponding target executable code on a target peer device;
determining, based on the information, an $N^{th}$ state of the target executable code, wherein N is an integer;
executing the target executable code on the target device and the corresponding target executable code on the target peer device to the $N^{th}$ state of the target executable code;
substituting a fuzzed input for a normal input to the target executable code for the $N^{th}$ state of the target executable code;
determining a deviation in behavior of the target executable code as a result of the substituting the fuzzed input for the normal input to the target executable code at the $N^{th}$ state of the target executable code; and
enabling access to information related to the deviation in the behavior of the target executable code as a result of the substituting the fuzzed input for the normal input to the target executable code at the $N^{th}$ state of the target executable code, wherein the target device executes a virtualized instance of the target executable code and the substituting the fuzzed input for the normal input to the target executable code for the $N^{th}$ state of the target executable code is performed iteratively by reverting the virtualized instance of the target executable code to the $N^{th}$ state of the target executable code for iterations subsequent to a first iteration rather than re-executing the target executable code to the $N^{th}$ state of the target executable code for iterations subsequent to the first iteration.

17. The non-transitory computer readable medium of claim 16, wherein the target device is a client device and the target peer device is a sever device.

18. The non-transitory computer readable medium of claim 16, wherein the target device is a sever device and the target peer device is a client device.

19. The non-transitory computer readable medium of claim 16, wherein the $N^{th}$ state of the target executable code is a network client input state or a network server input state.

20. The non-transitory computer readable medium of claim 16, wherein the target device is a virtualization device executing an instance emulating the target peer device to facilitate execution of a plurality of virtualized instances of the target executable code across a plurality of emulated virtual devices comprising the instance emulating the target peer device.

* * * * *